(12) United States Patent
Tang et al.

(10) Patent No.: US 10,893,430 B2
(45) Date of Patent: Jan. 12, 2021

(54) METHOD AND APPARATUS FOR TRANSMITTING CHANNEL STATE INFORMATION

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/239,189

(22) Filed: Jan. 3, 2019

(65) Prior Publication Data
US 2019/0141559 A1 May 9, 2019

Related U.S. Application Data

(63) Continuation of application No. PCT/CN2016/101215, filed on Sep. 30, 2016.

(51) Int. Cl.
*H04L 12/26* (2006.01)
*H04W 24/10* (2009.01)
(Continued)

(52) U.S. Cl.
CPC .......... *H04W 24/10* (2013.01); *H04L 1/0026* (2013.01); *H04L 5/0057* (2013.01); *H04W 72/042* (2013.01); *H04B 7/0619* (2013.01)

(58) Field of Classification Search
CPC .................................................... H04W 24/10
See application file for complete search history.

(56) References Cited

U.S. PATENT DOCUMENTS 9,219,590 B2 * 12/2015 Ko .......................... H04L 1/0026
10,505,669 B2 * 12/2019 Golitschek Edler Von Elbwart .............. H04W 72/042
(Continued)

FOREIGN PATENT DOCUMENTS

| CN | 104852786 A | 8/2015 |
|----|-------------|--------|
| CN | 104980252 A | 10/2015 |

(Continued)

OTHER PUBLICATIONS

Supplementary European Search Report dated Jun. 4, 2019 for Application No. EP16917331.7.
(Continued)

*Primary Examiner* — Guang W Li
(74) *Attorney, Agent, or Firm* — Ladas & Parry LLP

(57) ABSTRACT

Embodiments of the present disclosure provide a method and an apparatus for transmitting channel state information. The method includes: receiving, by a first terminal device, downlink control information DCI transmitted by a network device; determining, by the first terminal device, according to the DCI, whether it is necessary to report CSI; and when the first terminal device determines that it is necessary to report the CSI, transmitting, by the first terminal device, the CSI of the first terminal device to the network device. The first terminal device may be triggered to report the CSI according to the DCI transmitted by the network device, and thus the terminal device may report its own CSI.

13 Claims, 2 Drawing Sheets

(51) Int. Cl.
*H04W 72/04* (2009.01)
*H04L 5/00* (2006.01)
*H04L 1/00* (2006.01)
*H04B 7/06* (2006.01)

(56) References Cited

U.S. PATENT DOCUMENTS

| | | | |
|---|---|---|---|
| 2010/0272019 A1 | 10/2010 | Papasakellariou et al. | |
| 2011/0249578 A1* | 10/2011 | Nayeb Nazar | H04W 74/0841 370/252 |
| 2013/0301548 A1* | 11/2013 | Etemad | H04L 69/22 370/329 |
| 2014/0126402 A1* | 5/2014 | Nam | H04B 7/0632 370/252 |
| 2014/0204856 A1* | 7/2014 | Chen | H04L 5/0053 370/329 |
| 2014/0314012 A1* | 10/2014 | Tang | H04W 48/12 370/329 |
| 2015/0215018 A1* | 7/2015 | Xiong | H04W 24/10 370/329 |
| 2015/0312071 A1* | 10/2015 | Chen | H04L 1/0031 370/329 |
| 2015/0327247 A1* | 11/2015 | Chen | H04W 48/16 370/329 |
| 2016/0249337 A1* | 8/2016 | Liang | H04W 72/042 |
| 2016/0381587 A1* | 12/2016 | Alexey | G06F 9/4856 370/329 |
| 2018/0026769 A1* | 1/2018 | Lee | H04L 1/00 370/329 |
| 2018/0063736 A1* | 3/2018 | Sadeghi | H04W 24/10 |
| 2020/0045572 A1* | 2/2020 | Yum | H04W 52/243 |

FOREIGN PATENT DOCUMENTS

| | | | | |
|---|---|---|---|---|
| EP | 2658331 A1 | 10/2013 | | |
| JP | 2014505401 A | 2/2014 | | |
| WO | WO-2012094990 A1 * | 7/2012 | ........ | H04W 72/1294 |
| WO | 2014/019173 A1 | 2/2014 | | |
| WO | 2016077701 A1 | 5/2016 | | |
| WO | 2016/093618 A1 | 6/2016 | | |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification, (Release 13)", 3GPP Standard; 3GPP TS 36.331, 3rd Generation Partnership Project (3GPP), Mobile Competence Centre ; 650, Route Des Lucioles ; F-06921 Sophia-Antipolis Cedex; France, vol. RAN WG2, No. V13.2.0, Jul. 11, 2016 (Jul. 11, 2016), pp. 1-623, XP051123115.
International Search Report (ISR) dated Jul. 5, 2017 for Application No. PCT/CN2016/101215.
The First Office Action of corresponding Chinese application No. 201680087018.7, dated Mar. 10, 2020.
The First Office Action of corresponding European application No. 16917331.7, dated Sep. 2, 2020.
The First Office Action of corresponding Japanese application No. 2019-515871, dated Sep. 11, 2020.
Ericsson, Draft 36.211 eMTC CR capturing RAN1 #85 agreements[online], 3GPP TSG-RAN WG1#85 R1-165787, <URL:http://www.3gpp.org/ftp.tsg_ran/WG1_RL1/TSGR1_1858/Docs/R1-165787.zip>, Jun. 14, 2016.

* cited by examiner

METHOD AND APPARATUS FOR TRANSMITTING CHANNEL STATE INFORMATION

CROSS-REFERENCE TO RELATED APPLICATIONS

This application is a continuation of International Application No. PCT/CN2016/101215, filed on Sep. 30, 2016, the disclosure of which is hereby incorporated by reference in its entirety.

TECHNICAL FIELD

The present disclosure relates to the field of communications and, in particular, to a method and an apparatus for transmitting channel state information.

BACKGROUND

Incorporation of a terminal device in a long term evolution (Long Term Evolution, "LTE" for short) system requires reporting channel state information (Channel State Information, "CIS" for short) to a network device, however, how to trigger the terminal device to report the CSI is an urgent problem to be solved.

SUMMARY

A method and an apparatus for transmitting channel state information according to embodiments of the present disclosure may trigger a terminal device to report CSI, and thus the terminal device may report its own CSI.

In a first aspect, a method for transmitting channel state information is provided, including: receiving, by a first terminal device, downlink control information (Downlink Control Information, "DCI" for short) transmitted by a network device; determining, by the first terminal device, according to the DCI, whether it is necessary to report CSI; and when the first terminal device determines that it is necessary to report the CSI, transmitting, by the first terminal device, the CSI of the first terminal device to the network device.

In a first possible implementation of the first aspect, the DCI is used to indicate whether each of a plurality of terminal devices reports the CSI, and the plurality of terminal devices includes the first terminal device.

Specifically, the network device transmits the downlink control information to the plurality of terminal devices, where the downlink control information is used to indicate whether each of the plurality of terminal devices reports the CSI between each of the terminal devices and the network device. In this way, each of the plurality of terminal devices may determine, according to the downlink control information, whether it is necessary to feedback the CSI to the network device. When the first terminal device of the plurality of terminal devices determines, according to the downlink control information, that it is necessary to feedback the CSI between the first terminal device and the network device, the first terminal device transmits CSI of the first terminal device to the network device, the network device receives the CSI of the first terminal device transmitted by the first terminal device, and the network device determines channel quality information according to the CSI of the first terminal device; when the first terminal device determines, according to the downlink control information, that it is not necessary to feedback the CSI between the first terminal device and the network device, the first terminal device does not transmit the DCI of the first terminal device to the network device. In this way, transmitting, by the network device, the downlink control information to the terminal device once may trigger a plurality of terminal devices to report the CSI without transmitting the DCI to each of the terminal devices to trigger reporting of the CSI, and signaling overhead may be saved.

In conjunction with the possible implementations described above in the first aspect, in a second possible implementation of the first aspect, the DCI includes at least one of the following: a bit sequence for triggering reporting of the CSI, information about the number of times for reporting the CSI, information about a duration for reporting the CSI, physical resource configuration information for reporting the CSI, resource configuration information for measuring the CSI, indication information about a modulation and coding scheme MCS for transmitting the CSI, transmission mode hypothesis information, information about a type for reporting the CSI, codebook indication information, and codebook subset constraint information;

where a bit in the bit sequence for triggering reporting of the CSI is used to indicate whether each of a plurality of terminal devices reports the CSI, the plurality of terminal devices includes the first terminal device, the information about the number of times for reporting the CSI is used to indicate the number of times for the first terminal device to report the CSI, the information about the duration for reporting the CSI is used to indicate a duration for the first terminal device to report the CSI, the physical resource configuration information for reporting to the CSI is used to indicate a physical resource used by the first terminal device to report the CSI, the resource configuration information for measuring the CSI is used to indicate a resource used by the first terminal device to measure the CSI, the indication information about the MCS for transmitting the CSI is used to indicate a modulation and coding scheme used by the first terminal device to report the CSI, the transmission mode hypothesis information is used to indicate a transmission mode used by the network device to transmit downlink data to the first terminal device, the information about the type for reporting the CSI is used to indicate a type for the first terminal device to report the CSI, the codebook indication information is used to indicate a codebook based on which the first terminal device measures the CSI and reports the CSI, and the codebook subset constraint information is used to indicate a codeword based on which the first terminal device measures the CSI and reports the CSI.

In conjunction with the possible implementations described above in the first aspect, in a third possible implementation of the first aspect, if the bit sequence for triggering reporting of the CSI includes a plurality of bits, each bit in the bit sequence for triggering reporting of the CSI is used to indicate whether one of the plurality of terminal devices reports the CSI.

In conjunction with the possible implementations described above in the first aspect, in a fourth implementation of the first aspect, the physical resource configuration information for reporting the CSI is specifically used to indicate a respective physical resource used by each of the plurality of terminal devices that needs to report the CSI to report the CSI, or the physical resource configuration information for reporting the CSI is specifically used to indicate a physical resource commonly used by all terminal devices of the plurality of terminal devices that need to report the CSI to report the CSI.

In conjunction with the possible implementations described above in the first aspect, in a fifth implementation of the first aspect, the physical resource configuration information for reporting the CSI is used to indicate a frequency domain resource and/or a time domain resource used by the first terminal device to report the CSI.

In conjunction with the possible implementations described above in the first aspect in a sixth implementation of the first aspect, the resource configuration information for measuring the CSI includes at least one of a CSI process, resource configuration information of a downlink pilot, and resource configuration information for measuring interference.

In conjunction with the possible implementations described above in the first aspect, in a seventh implementation of the first aspect, before the receiving, by the first terminal device, the DCI transmitted by the network device, the method further includes: receiving, by the first terminal device, a group identifier Group ID or a group CSI radio network temporary identifier Group-CSI-RNTI transmitted by the network device; the receiving, by the first terminal device, the DCI transmitted by the network device includes: receiving, by the first terminal device, according to the Group ID or the Group-CSI-RNTI, the DCI transmitted by the network device.

In conjunction with the possible implementations described above in the first aspect, in an eighth implementation of the first aspect, the DCI includes the bit sequence for triggering reporting of the CSI, before the determining, by the first terminal device, according to the DCI, whether it is necessary to report the CSI, the method further includes:

receiving, by the first terminal device, index information of the first terminal device transmitted by the network device, where the index information of the first terminal device is used to indicate a position of a bit for triggering reporting of the CSI corresponding to the first terminal device in the bit sequence for triggering reporting of the CSI; where the determining, by the first terminal device, according to the DCI, whether it is necessary to report the CSI includes: determining, by the first terminal device, according to the index information of the first terminal device, the bit for triggering reporting of the CSI corresponding to the first terminal device; and determining, by the first terminal device, according to the bit for triggering reporting of the CSI corresponding to the first terminal device, whether it is necessary to report the CSI.

In conjunction with the possible implementations described above in the first aspect, in a ninth implementation of the first aspect, the DCI includes the indication information about the MCS used for reporting the CSI, before the transmitting, by the first terminal device, the CSI of the first terminal device to the network device, the method further includes: determining, by the first terminal device, according to the indication information about the MCS used for reporting the CSI, the modulation and coding scheme used for reporting the CSI; where the transmitting, by the first terminal, the CSI of the first terminal device to the network device includes: transmitting, by the first terminal device, according to the MCS used for reporting the CSI, the CSI of the first terminal device to the network device.

In conjunction with the possible implementations described above in the first aspect, in a tenth implementation of the first aspect, the DCI includes the physical resource configuration information for reporting the CSI, before the transmitting, by the first terminal device, the CSI of the first terminal device to the network device, the method further includes: determining, by the first terminal device, according to the physical resource configuration information for reporting the CSI, a first reporting resource for reporting the CSI of the first terminal device; where the transmitting, by the first terminal device, the CSI of the first terminal device to the network device includes: transmitting, by the first terminal device, the CSI of the first terminal device to the network device over the first reporting resource.

In conjunction with the possible implementations described above in the first aspect, in an eleventh implementation of the first aspect, the determining, by the first terminal device, according to the physical resource configuration information for reporting the CSI, the first reporting resource for reporting the CSI of the first terminal device includes: determining, by the first terminal device, according to the physical resource configuration information for reporting the CSI, a first resource region for transmitting the CSI of the first terminal device; and determining, by the first terminal device, from resources of the first resource region, the first reporting resource for transmitting the CSI of the first terminal device.

In conjunction with the possible implementations described above in the first aspect, in a twelfth implementation of the first aspect, the determining, by the first terminal device, from the resources of the first resource region, the first reporting resource for transmitting the CSI of the first terminal device includes: determining, by the first terminal device, all resources in the first resource region as the first reporting resource; or determining, by the first terminal device, a plurality of physical resources randomly selected from the first resource region as the first reporting resource.

In conjunction with the possible implementations described above in the first aspect, in a thirteenth implementation of the first aspect, before the determining, by the first terminal device, from the resources of the first resource region, the first reporting resource for transmitting the CSI of the first terminal device, the method further includes: receiving, by the first terminal device, a physical resource index transmitted by the network device, where the physical resource index is used to indicate a position of a resource for transmitting the CSI of the first terminal device; where the determining, by the first terminal device, from the resources of the first resource region, the first reporting resource for transmitting the CSI of the first terminal device includes: determining, by the first terminal device, from the resources of the first resource region according to the physical resource index, the first reporting resource for transmitting the CSI of the first terminal device.

In conjunction with the possible implementations described above in the first aspect, in a fourteenth implementation of the first aspect, before the determining, by the first terminal device, from the resources of the first resource region, the first reporting resource for transmitting the CSI of the first terminal device, the method further includes: receiving, by the first terminal device, an index of the first terminal device transmitted by the network device, where the index of the first terminal device is used to indicate information about a position of the first terminal device in a terminal device that needs to report the CSI; where the determining, by the first terminal device, from the resources of the first resource region, the first reporting resource for transmitting the CSI of the first terminal device includes: determining, by the first terminal device, from the resources of the first resource region according to the index of the first terminal device, the first reporting resource for transmitting the CSI of the first terminal device.

In conjunction with the possible implementations described above in the first aspect, in a fifteenth implementation of the first aspect, the determining, by the first terminal device, from the resources of the first resource region, the first reporting resource for transmitting the CSI of the first terminal device includes: calculating, by the first terminal device, according to the MCS for the first terminal device to report the CSI and a bit occupied by the CSI of the first terminal device, a size of a physical resource for reporting the CSI; and determining, by the first terminal device, from the resources of the first resource region according to the calculated size of the physical resource for reporting the CSI, the first reporting resource for transmitting the CSI of the first terminal device.

In conjunction with the possible implementations described above in the first aspect, in a sixteenth implementation of the first aspect, the first reporting resource and a second physical resource used by a second terminal device that needs to report the CSI indicated via the DCI to report the CSI are multiplexed by a frequency division multiplexing FDM mode, a to time division multiplexing TDM mode or a code division multiplexing CDM mode.

In conjunction with the possible implementations described above in the first aspect, in a seventeenth implementation of the first aspect, before the transmitting, by the first terminal device, the CSI of the first terminal device to the network device according to the DCI, the method further includes: measuring, by the first terminal device, the CSI of the first terminal device.

In conjunction with the possible implementations described above in the first aspect, in an eighteenth implementation of the first aspect, the DCI includes the resource configuration information for measuring the CSI, where the measuring, by the first terminal device, the CSI of the first terminal device includes: determining, by the first terminal device, according to the resource configuration information for measuring the CSI, a first measurement resource for measuring the CSI of the first terminal device; and measuring, by the first terminal device, the CSI of the first terminal device according to the first measurement resource.

In conjunction with the possible implementations described above in the first aspect, in a nineteenth implementation of the first aspect, the determining, by the first terminal device, according to the resource configuration information for measuring the CSI, the first measurement resource for measuring the CSI of the first terminal device includes: determining, by the terminal device, according to a first measurement resource configuration included in the resource configuration information for measuring the CSI, the first measurement resource for measuring the CSI of the first terminal device.

In conjunction with the possible implementations described above in the first aspect, in a twentieth implementation of the first aspect, before the determining, by the first terminal device, according to the resource configuration information for measuring the CSI, the first measurement resource for measuring the CSI of the first terminal device, the method further includes: receiving, by the terminal device, N first measurement resource configuration transmitted by the network device; where the determining, by the first terminal device, according to the resource configuration information for measuring the CSI, the first measurement resource for measuring the CSI of the first terminal device includes: determining, by the terminal device, according to indication information about measurement resource configuration included in the resource configuration information for measuring the CSI, M first measurement resource configuration from the N first measurement resource configuration; and determining, by the terminal device, according to the M first measurement resource configuration, the first measurement resource for measuring the CSI of the first terminal device, where M is an integer greater than or equal to 1 and less than or equal to N, and N is an integer greater than or equal to 1.

In conjunction with the possible implementations described above in the first aspect, in a twenty-first implementation of the first aspect, the DCI includes the transmission mode hypothesis information, where the measuring, by the first terminal device, the CSI of the first terminal device includes: determining, by the first terminal device, according to the transmission mode hypothesis information, a transmission mode used by the network device to transmit downlink data; and measuring, by the first terminal device, based on the transmission mode used by the network device to transmit the downlink data, the CSI of the first terminal device.

In conjunction with the possible implementations described above in the first aspect, in a twenty-second implementation of the first aspect, the DCI includes the information about the type for reporting the CSI, the measuring, by the first terminal device, the CSI of the first terminal device includes: determining, by the first terminal device, according to the information about the type for reporting the CSI, a type for transmitting the CSI of the first terminal device to the network device; and measuring, by the first terminal device, the CSI of the first terminal device based on the type of the CSI of the first terminal device.

In conjunction with the possible implementations described above in the first aspect, in a twenty-third implementation of the first aspect, the DCI includes the cookbook indication information, where the measuring, by the first terminal device, the CSI of the first terminal device includes: determining, by the first terminal device, according to the codebook indication information, a codebook based on which the CSI of the first terminal device is measured; and measuring, by the first terminal device, the CSI of the first terminal device according to the codebook based an which the CSI of the first terminal device is measured; the transmitting, by the first terminal device, the CSI of the first terminal device to the network device includes: transmitting, by the first terminal device, the CSI of the first terminal device to the network device according to the codebook based on which the CSI of the first terminal device is to measured.

In conjunction with the possible implementations described above in the first aspect, in a twenty-fourth implementation of the first aspect, the DCI includes the codebook subset constraint information, where the measuring, by the first terminal device, the CSI of the first terminal device includes: determining, by the first terminal device, according to the codebook subset constraint information, a codeword based on which the CSI of the first terminal device is measured; and measuring, by the first terminal device, the CSI of the first terminal device according to the codeword based on which the CSI of the first terminal device is measured; the transmitting, by the first terminal device, the CSI of the first terminal device to the network device includes: transmitting, by the first terminal device, the CSI of the first terminal device to the network device according to the codeword based on which the CSI of the first terminal device is measured.

In conjunction with the possible implementations described above in the first aspect, in a twenty-fifth implementation of the first aspect, before the transmitting, by the first terminal device, the CSI of the first terminal device to the network device according to the DCI, the method further includes: receiving, by the first terminal device, information about the number of times for reporting the CSI and/or information about a duration for reporting the CSI transmitted by the network device; where the transmitting, by the first terminal device, the CSI of the first terminal device to the network device includes: determining, by the first terminal device, according to the information about the number of times for reporting the CSI and/or the information about the duration for =porting the CSI, the number of times for reporting the CSI and/or the duration for reporting the CSI; and transmitting, by the first terminal device, the CSI of the first terminal device to the network device according to the number of times for reporting the CSI and/or the duration for reporting the CSI.

In conjunction with the possible implementations described above in the first aspect, in a twenty-sixth implementation of the first aspect, the CSI includes at least one of a precoding matrix index PMI, a rank index RI, and a channel quality index CQI.

In a second aspect, a method for transmitting channel state information is provided, including: transmitting, by a network device, downlink control information DCI to a first terminal device; and receiving, by the network device, CSI of the first terminal device transmitted by the first terminal device according to the DCI.

In a first possible implementation of the second aspect, the DCI is used to indicate whether each of a plurality of terminal devices reports the CSI, and the plurality of terminal devices includes the first terminal device.

In conjunction with the possible implementations described above in the second aspect, in a second possible implementation of the second aspect, the DCI includes at least one of the following: a bit sequence for triggering reporting of the CSI, information about the number of times for reporting the CSI, information about a duration for reporting the CSI, physical resource configuration information for reporting the CSI, resource configuration information for measuring the CSI, indication information about a modulation and coding scheme MCS for transmitting the CSI, transmission mode hypothesis information, information about a type for reporting the CSI, codebook indication information, and codebook subset constraint information;

where a bit in the bit sequence for triggering reporting of the CSI is used to indicate whether each of a plurality of terminal devices reports the CSI, the plurality of terminal devices includes the first terminal device, the information about the number of times for reporting the CSI is used to indicate the number of times for a terminal device of the plurality of terminal devices that needs to report the CSI to report the CSI, the information about the duration for reporting the CSI is used to indicate a duration for the terminal device of the plurality of terminal devices that needs to report the CSI to report the CSI, the physical resource configuration information for reporting the CSI is used to indicate a physical resource used by the terminal device of the plurality of terminal devices that needs to report the CSI to report the CSI, the resource configuration information for measuring the CSI is used to indicate a resource used by the terminal device of the plurality of terminal devices that needs to report the CSI to measure the CSI, the indication information about the MCS for transmitting the CSI is used to indicate a modulation and coding scheme used by the terminal device of the plurality of terminal devices that needs to report the CSI to report the CSI, the transmission mode hypothesis information is used to indicate a transmission mode used by the network device to transmit downlink data to the terminal device of the plurality of terminal devices that needs to report the CSI, the information about the type for reporting the CSI is used to indicate a type for the terminal device to of the plurality of terminal devices that needs to report the CSI to report the CSI, the codebook indication information is used to indicate a codebook based on which the terminal device of the plurality of terminal devices that needs to report the CSI measures the CSI and reports the CSI, and the codebook subset constraint information is used to indicate a codeword based on which the terminal device of the plurality of terminal devices that needs to report the CSI measures the CSI and reports the CSI.

In conjunction with the possible implementations described above in the second aspect, in a third possible implementation of the second aspect, if the bit sequence for triggering reporting of the CSI includes a plurality of bits, each bit in the bit sequence for triggering reporting of the CSI is used to indicate whether one of the plurality of terminal devices reports the CSI.

In conjunction with the possible implementations described above in the second aspect, in a fourth implementation of the second aspect, the physical resource configuration information for reporting the CSI is specifically used to indicate a respective physical resource used by each of the plurality of terminal devices that needs to report the CSI to report the CSI, or the physical resource configuration information for reporting the CSI is specifically used to indicate a physical resource commonly used by all to terminal devices of the plurality of terminal devices that need to report the CSI to report the CSI.

In conjunction with the possible implementations described above in the second aspect, in a fifth implementation of the second aspect, the respective physical resource used by each of the plurality of terminal devices that needs to report the CSI to report the CSI includes a frequency domain resource and/or a tune domain resource; and/or the physical resource commonly used by all terminal devices of the plurality of terminal devices that need to report the CSI to report the CSI includes a frequency domain resource and/or a time domain resource.

In conjunction with the possible implementations described above in the second aspect, in a sixth implementation of the second aspect, the resource configuration information for measuring the CSI includes at least one of a CSI process, resource configuration information of a downlink pilot, and resource configuration information for measuring interference.

In conjunction with the possible implementations described above in the second aspect, in a seventh implementation of the second aspect, the transmitting, by the network device, the DCI to the plurality of terminal devices includes: transmitting, by the network device, to the plurality of terminal devices, the DCI that is performed with cyclic redundancy check CRC scrambling via a group identifier Group ID or a group CSI radio network temporary identifier Group-CSI-RNTI, where the Group ID is used to indicate identity information commonly used by the plurality of terminal devices, and the Group-CSI-RNTI is used to indicate radio network temporary identifier information commonly used by the plurality of terminal devices.

In conjunction with the possible implementations described above in the second aspect, in an eighth implementation of the second aspect, before the transmitting, by the network device, the DCI to the plurality of terminal devices, the method further includes: transmitting, by the network device, the Group ID or the Group-CSI-RNTI to the plurality of terminal devices, so that the plurality of terminal devices receive, according to the Group ID or the Group-CSI-RNTI, the DCI that is performed with the CRC scrambling via the Group ID or the group CSI radio network temporary identifier Group-CSI-RNTI.

In conjunction with the possible implementations described above in the second aspect, in a ninth implementation of the second aspect, the DCI includes the bit sequence for triggering reporting of the CSI, before the receiving, by the network device, the CSI of the first terminal device transmitted by the first terminal device according to the DCI, the method further includes: transmitting, by the network device, index information of the first terminal device to the first terminal device, where the index information of the first terminal device is used to indicate a position of a bit for triggering reporting of the CSI corresponding to the first terminal device in the bit sequence for triggering reporting of the CSI, so that the first terminal device determines, according to the index information of the first terminal device, the bit for triggering reporting of the CSI corresponding to the first terminal device, and determines, according to the bit for triggering reporting of the CSI, whether it is necessary to report the CSI of the first terminal device.

In conjunction with the possible implementations described above in the second aspect, in a tenth implementation of the second aspect, the DCI includes the physical resource configuration information for reporting the CSI, where the receiving, by the network device, the CSI of the first terminal device transmitted by the first terminal device according to the DCI to includes: receiving, by the network device, the CSI of the first terminal device transmitted by the first terminal device over a first reporting resource, where the first reporting resource is determined by the first terminal device according to the physical resource configuration information for reporting the CSI included in the DCI.

In conjunction with the possible implementations described above in the second aspect, in an eleventh implementation of the second aspect, before the receiving, by the network device, the CSI of the first terminal device transmitted by the first terminal device according to the DCI, the method further includes: transmitting, by the network device, a physical resource index to the first terminal device, where the physical resource index is used to indicate a position of a resource for transmitting the CSI of the first terminal device; where the receiving, by the network device, the CSI of the first terminal device transmitted by the first terminal device over the first reporting resource includes: receiving, by the network device, the CSI of the first terminal device transmitted over the first reporting resource determined by the first terminal device from resources of a first resource region according to the physical resource configuration information for reporting the CSI, where the first resource region is determined according to the physical resource configuration information for reporting the CSI.

In conjunction with the possible implementations described above in the second aspect, in a twelfth implementation of the second aspect, before the receiving, by the network device, the CSI of the first terminal device transmitted by the first terminal device according to the DCI, the method further includes: transmitting, by the network device, an index of the first terminal device to the first terminal device, where the index of the first terminal device is used to indicate information about a position of the first terminal device in the terminal device that needs to report the CSI; where the receiving, by the network device, the CSI of the first terminal device transmitted by the first terminal device over the first reporting resource includes: receiving, by the network device, the CSI of the first terminal device transmitted over the first reporting resource determined by the first terminal device from resources of the first resource region according to the index of the first terminal device, where the first resource region is determined according to the physical resource configuration information for reporting the CSI.

In conjunction with the possible implementations described above in the second aspect, in a thirteenth implementation of the second aspect, before the transmitting, by the network device, the downlink control information DCI to the first terminal device, the method further includes: transmitting, by the network device, N first measurement resource configuration to the first terminal device, so that the terminal device determines, according to indication information about measurement resource configuration included in the resource configuration information for measuring the CSI, M first measurement resource configuration from the N first measurement resource configuration, and determines, according to the M first measurement resource configuration, the first measurement resource for measuring the CSI of the first terminal device, where M is an integer greater than or equal to 1 and less than or equal to N, and N is an integer greater than or equal to 1.

In conjunction with the possible implementations described above in the second aspect, in a fourteenth implementation of the second aspect, before the receiving, by the network device, the CSI of the first terminal device transmitted by the first terminal device according to the DCI, the method further includes: transmitting, by the network device, to the plurality of terminal devices, information about the number of times for reporting the CSI and/or information about a duration for reporting the CSI; where the receiving, by the network device, the CSI of the first terminal device transmitted by the first terminal device according to the DCI includes: receiving, by the network device, the CSI of the first terminal device transmitted by the first terminal device according to the information about the number of times for reporting the CSI and/or the information about the duration for reporting the CSI and the DCI.

In conjunction with the possible implementations described above in the second aspect, in a fifteenth implementation of the second aspect, the CSI includes at least one of a precoding matrix index PMI, a rank index RI, and a channel quality index CQI.

In a third aspect, an apparatus for transmitting channel state information is provided, which is configured to perform the method described above in the first aspect or any possible implementation of the first aspect. Specifically, the apparatus includes a unit for performing the method described above in the first aspect or any possible implementation of the first aspect.

In a fourth aspect, an apparatus for transmitting channel state information is provided, which is configured to perform the method described above in the second aspect or any possible implementation of the second aspect. Specifically, the apparatus includes a unit for performing the method described above in the second aspect or any possible implementation of the second aspect.

In a fifth aspect, a system for transmitting channel state information is provided, which includes the apparatus described above in the third aspect or any possible implementation of the third aspect and the apparatus described above in the fourth aspect or any possible implementation of the fourth aspect.

In a sixth aspect, an apparatus for transmitting channel state information is provided, which includes: a receiver, a transmitter, a memory, a processor, and a bus system. The receiver, the transmitter, the memory and the processor are connected via the bus system, where the memory is configured to store an instruction, the processor is configured to execute the instruction stored in the memory to control the receiver to receive a signal and to control the transmitter to transmit a signal, and when the processor executes the instruction stored in the memory, the execution causes the processor to perform the method in the first aspect or any possible implementation of the first aspect.

In a seventh aspect, an apparatus for transmitting channel state information is provided, which includes: a receiver, a transmitter, a memory, a processor, and a bus system. The receiver, the transmitter, the memory and the processor are connected via the bus system, where the memory is configured to store an instruction, the processor is configured to execute the instruction stored in the memory to control the receiver to receive a signal and to control the transmitter to transmit a signal, and when the processor executes the instruction stored in the memory, the execution causes the processor to perform the method in the second aspect or any possible implementation of the second aspect.

In an eighth aspect, a computer readable medium for storing a computer program is provided, where the computer program includes an instruction for performing the method in the first aspect or any possible implementation of the first aspect.

In a ninth aspect, a computer readable medium for storing a computer program is provided, where the computer program includes an instruction for performing the method the second aspect or any possible implementation of the second aspect.

BRIEF DESCRIPTION OF DRAWINGS

In order to describe the technical solution in embodiments of the present disclosure more clearly, accompanying drawings used in the description of the embodiments or the prior art will be briefly described hereunder. Obviously, the described drawings are merely some embodiments of present disclosure. For persons skilled in the art, other drawings may be obtained based on these drawings without any creative work.

DESCRIPTION OF EMBODIMENTS

Figure 1:
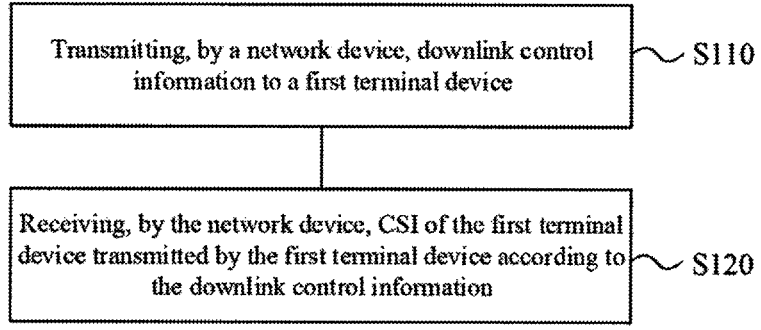
FIG. 1 is a schematic diagram of a method for transmitting channel state information according to an embodiment of the present disclosure.

The technical solution in the embodiments of the present disclosure will be clearly and completely described below with reference to the accompanying drawings in the embodiments of the present disclosure. Obviously, the described embodiments are a part of the embodiments of the present disclosure, rather than all embodiments of the present disclosure. All other embodiments obtained by persons of ordinary skill in the art based on the embodiments of the present disclosure without any creative effort should fall into the protection scope of the present disclosure.

It should be understood that the technical solution in the embodiments of the present application can be applied to various communication systems, for example, a global system of mobile communication (Global System of Mobile communication, "GSM" for short) system, a code division multiple access (Code Division Multiple Access, "CDMA" for short) system, a wideband code division multiple access (Wideband Code Division Multiple Access, "WCDMA" for short) system, a general packet radio service (General Packet. Radio Service, "GPRS" for short), a long term evolution (Long Term Evolution, "LTE" for short) system, an LTE frequency division duplex (Frequency Division Duplex, "FDD" for short) system, an LTE time division duplex (Time Division Duplex, "TDD" for short), a universal mobile telecommunication system (Universal Mobile Telecommunication System, "UMTS" for short) or a worldwide interoperability for microwave access (Worldwide Interoperability for Microwave Access, "WiMAX" for short) communication system, and a communication system that may appear in the future, or the like.

It should also be understood that, in the embodiments of the present disclosure, the terminal device may be termed as user equipment (User Equipment, "UE" for short), a terminal device, a mobile station (Mobile Station, "MS" for short), a mobile terminal (Mobile Terminal), a terminal device in a future 5G network, or the like; the terminal device may communicate with one or more core networks via a radio access network (Radio Access Network, "RAN" for short), for example, the terminal may be a mobile phone (or termed as a "cellular" phone), a computer with the mobile terminal, or the like; for example, the terminal may also be portable, pocket, handheld, computer built-in or vehicle-mounted mobile devices that exchange voice and/or data with the radio access network.

The network device may be used to communicate with the mobile device. The network device may be a base station (Base Transceiver Station, "BTS" for short) in the global system of mobile communication (Global System of Mobile communication, "GSM" for short) or the code division multiple access (Code Division. Multiple Access, "CDMA" for short), or a base station (NodeB, "NB" for short) in the wideband code division multiple access (Wideband Code Division Multiple Access, "WCDMA" for short), or an evolved base station (Evolutional Node B, "eNB" or "eNodeB" for short) in the LTE, or a relay station or an access point, or a vehicle-mounted device, a wearable device, or an access network device in the future 5G network.

FIG. 1 shows a schematic flow chart of a method 100 for transmitting channel state information according to an embodiment of the present disclosure. FIG. 1 shows steps or operations of the method for transmitting the channel state information; however, these steps or operations are merely examples, in the embodiment of the present disclosure, other operations or variants of the operations of FIG. 1 may also be performed. The method 100 includes:

S110, transmitting, by a network device, downlink control information to a first terminal device; and S120, receiving, by the network device, CSI of the first terminal device transmitted by the first terminal device according to the downlink control information.

Figure 2:
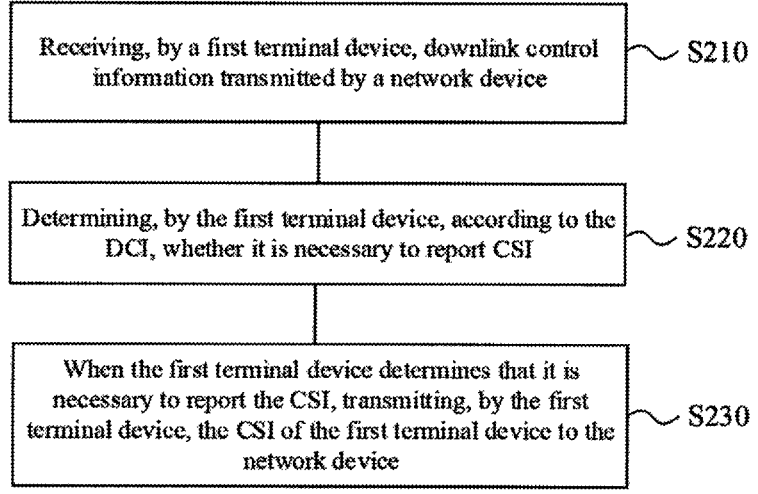
FIG. 2 is a schematic diagram of another method for transmitting channel state information according to an embodiment of the present disclosure.

FIG. 2 shows a schematic flow chart of a method 200 for transmitting channel state information according to an embodiment of the present disclosure. FIG. 2 shows steps or operations of the method for transmitting the channel state information; however, these steps or operations are merely examples, in the embodiment of the present disclosure, other operations or variants of the operations of FIG. 2 may also be performed. The method 200 includes:

S210, receiving, by a first terminal device, downlink control information transmitted by a network device;

S220, determining, by the first terminal device, according to the DCI, whether it is necessary to report CSI; and S230, when the first terminal device determines that it is necessary to report the CSI, transmitting, by the first terminal device, the CSI of the first terminal device to the network device.

Therefore, the first terminal device may be triggered to report the CSI according to the DCI transmitted by the network device, and thus the terminal device may report its own CSI.

In an embodiment, the DCI is used to indicate whether each of a plurality of terminal devices reports the CSI, and the plurality of terminal devices includes the first terminal device Specifically, the network device transmits the downlink control information to the plurality of terminal devices, where the downlink control information is used to indicate whether each of the plurality of terminal devices reports the CSI between each of the terminal devices and the network device. In this way, each of the plurality of terminal devices may determine, according to the downlink control information, whether it is necessary to feedback the CSI to the network device. When a first terminal device of the plurality of terminal devices determines, according to the downlink control information, that it is necessary to feedback the CSI between the first terminal device and the network device, the first terminal device transmits CSI of the first terminal device to the network device, the network device receives the CSI of the first terminal device transmitted by the first terminal device, and the network device determines channel quality information according to the CSI of the first terminal device; when the first terminal device determines, according to the downlink control information, that it is not necessary to feedback the CSI between the first terminal device and the network device, the first terminal device does not transmit the DCI of the first terminal device to the network device. In this way, transmitting, by the network device, the downlink control information to the terminal device once may trigger a plurality of terminal devices to report the CSI without transmitting the DCI to each of the terminal devices to trigger reporting of the CSI, and signaling overhead may be saved.

More specifically, the network device may transmit the DCI to the plurality of terminal devices over a physical downlink control channel (Physical Downlink Control Channel, "PDCCH" for short) or a physical downlink shared channel (Physical Downlink Shared Channel, "PDSCH" for short). In this way, each of the plurality of terminal devices may detect the downlink control information in the downlink shared channel.

It should be understood that the DCI mentioned in the embodiments of the present disclosure may be downlink control information in the LTE, or any high-level signaling transmitted by the network device to the terminal device may be termed as the DCI, or the DCI may also be downlink control information in a future network system, all of which are not limited in the embodiments of the present disclosure.

The CSI mentioned in the embodiments of the present disclosure may include: at least one of a precoding matrix index (Preceding Matrix Index, "PMI" for short), a rank index (Rank Index, "RI" for short), and a channel quality index (Channel Quality Index, "CQI" for short).

In an embodiment, before the network device transmits the downlink control information to the plurality of terminal devices, the network device may transmit a group identifier Group ID or a group CSI radio network temporary identifier Group-CSI-RNTI to the plurality of terminal devices, and the first terminal device of the plurality of terminal devices receives the Group ID or the Group-CSI-RNTI, where the Group ID is used to indicate identity information commonly used by the plurality of terminal devices, and the Group-CSI-RNTI is used to indicate radio network temporary identifier information commonly used by the plurality of terminal devices. Then, the network device may transmit, to the plurality of terminal devices, the downlink control information that is performed with CRC scrambling via the group identifier Group ID or the group CSI radio network temporary identifier Group-CSI-RNTI, and the first terminal device of the plurality of terminal devices receives, according to the received Group ID or the received Group-CSI-RNTI, the downlink control information that is performed with the CRC scrambling via the group identifier Group ID or the group CSI radio network temporary identifier Group-CSI-RNTI. Therefore, the network device may use specific identifier information to scramble the downlink control information, and the terminal device uses the specific identifier information to de-scramble the downlink control information, so that it is ensured that the terminal device may correctly receive the downlink control information. For example, the network device may use other information to scramble the downlink control information, while specific information based on which the scrambling is performed may be protocol-provided or network-configured, and is not limited in the embodiments of the present disclosure.

It should be understood that the first terminal device may be any one of the plurality of terminal devices, and the number of terminal devices of the plurality of terminal devices may be a preset number.

It should also be understood that the downlink control information indicates the number of times for a terminal device of the plurality of terminal devices that needs to report the CSI to report the CSI, where the number of times for reporting the CSI may be one time or multiple times, or the reporting may be continuous. Certainly, all terminal devices of the plurality of terminal devices that need to report the CSI may use the same number of times of reporting or use a different number of times of reporting, which is not limited in the embodiments of the present disclosure.

In an embodiment, the downlink control information includes at least one of the following ten items:

First item: a bit sequence for triggering reporting of the CSI. A bit in the bit sequence for triggering reporting of the CSI corresponds to a bit of the plurality of terminal devices, or the bit sequence for triggering reporting of the CSI may be only a bit to indicate whether all terminal devices of the plurality of terminal devices report the CSI, or a bit in the bit sequence for triggering reporting of the CSI may indicate whether more than two terminal devices report the CSI. Specifically, whether the plurality of terminal devices reports the CSI may be indicated by using a bitmap, a length of the bit sequence may be the same as the number of the terminal devices, that is, one bit corresponds to one terminal device. For example, a bit sequence having a length of 10 bits corresponds to 10 terminal devices, where a bit in the sequence of 10 bits having a bit value of 1 may indicate that the terminal device corresponding to this bit reports the CSI, and a bit in the sequence of 10 bits having a bit value of 0 may indicate that the terminal device corresponding to this bit does not report the CSI. Certainly, a plurality of bits in the bit sequence may correspond to one of the plurality of terminal devices.

In an embodiment, when the downlink control information includes the bit sequence for triggering reporting of the CSI, before S120, the method 100 further includes: transmitting, by the network device, index information of each of the plurality of terminal devices to the respective terminal device of the plurality of terminal devices, where the index information of each of the terminal devices is used to indicate a position of each of the terminal devices in the bit sequence for triggering reporting of the CSI; before S220, the method 200 further includes: receiving, by the first terminal device, index information of the first terminal device transmitted by the network device; where S220 includes: transmitting, by the first terminal device, CSI of the first terminal device to the network device according to the index information of the first terminal device and the bit sequence; and S120 includes: receiving, by the network device, the CSI of the first terminal device transmitted by the first terminal device according to the index information of the first terminal device and the bit sequence.

Specifically, the network device transmits an index of each of the plurality of terminal devices to each of the terminal devices, where the index may be simultaneously transmitted to each of the plurality of terminal devices or may be separately transmitted to each of the plurality of terminal devices. That is to say, each of the terminal devices may determine a position thereof in the bit sequence according to its own index, then determines, according to a bit value over the position of each of the terminal devices in the bit sequence, whether to feedback its own CSI to the network device. For example, assuming that the bit sequence has a length of 10, the bit sequence is corresponding to 10 terminal devices, that is also to say, the bit sequence may trigger the 10 terminal devices whether to report CSI; assuming that the bit sequence has a value of {10100110000}, by default, the bit sequence is corresponding to an index of 0123456789 from left to right; and assuming that the index of the first terminal device is 2 and a corresponding bit over a bit position of the index 2 has a value of 1, then the first terminal device determines that it is necessary to report the CSI.

Second item: information about the number of times for reporting the CSI. The information about the number of times for reporting the CSI is used to indicate the number of times for a terminal device of the plurality of terminal devices that needs to report the CSI to report the CSI. Certainly, the number of times for reporting the CSI may also indicate the number of times for each of the plurality of terminal devices to report the CSI, thus the number of times for each of the terminal devices to report the CSI may be indicated by one indication, even if there are, in the plurality of terminal devices, terminal devices that do not need to report the CSI, the terminal devices that do not need to report the CSI may also be indicated, thus when the downlink control information that is received next time by these terminal devices that do not need to report the CSI indicates that these terminal devices report the CSI, the number of times for reporting the CSI may not be indicated. The number of times for reporting the CSI may be a common number of times for the terminal devices of the plurality of terminal devices that need to report the CSI to report the CSI, or may be respective number of times for the terminal devices of the plurality of terminal devices that need to report the CSI to report their own CSI, alternatively, the number of times for reporting the CSI may be the number of times for one terminal device to report the CSI, or may be the number of times for multiple terminal devices to report the CSI, which is not limited in the embodiments of the present disclosure.

Third item: information about a duration for reporting the CSI. The information about the duration for reporting the CSI is used to indicate a duration for the terminal device of the plurality of terminal devices that needs to report the CSI to report the CSI. Certainly, the duration for reporting the CSI may also indicate the duration for each of the plurality of terminal devices to report the CSI, thus the duration for each of the terminal devices to report the CSI may be indicated by one indication, even if there are, in the plurality of terminal devices, terminal devices that do not need to report the CSI, the terminal devices that do not need to report the CSI may also be indicated, thus when the downlink control information that is received next time by these terminal devices that do not need to report the CSI indicates that these terminal devices report the CSI, the duration for reporting the CSI may not be indicated. The duration for reporting the CSI may be a common duration for the terminal devices of the plurality of terminal devices that need to report the CSI to report the CSI, or may be respective durations for the terminal devices of the plurality of terminal devices that need to report the CSI to report their own CSI, alternatively, the duration for reporting the CSI may be a duration for one terminal device to report the CSI, or may be a duration for multiple terminal devices to report the CSI, which is not limited in the embodiments of the present disclosure.

Specifically, assuming that the number of times for reporting the CSI is N, the CSI may be reported for N times periodically, where N is an integer greater than or equal to 1; assuming that the duration for reporting the CSI is T, the CSI may be periodically reported in the duration T, where T is greater than or equal to 0. Certainly, it may also be that both the duration for reporting the CSI and the number of times for reporting the CSI are indicated, that is, it is indicated that the CSI is reported for N times in the duration T, or that the CSI is periodically reported for N times in the duration T. More specifically, the network may configure, for the terminal device, a first mapping relationship between the number of times for reporting the CSI and a resource, or a mapping relationship between the number of times for reporting the CSI and the resource may be protocol-provided. For example, the first mapping relationship may be about a case where the CSI is reported N times using the same resource, or the first mapping relationship may be about a case where frequency domain resources used for reporting the CSI for N times may be a frequency modulation relationship at a frequency domain. For example, one CSI is reported over a specific sub-band at each interval. The network may configure, for the terminal device, a first mapping relationship between the duration for reporting the CSI and a resource, or a mapping relationship between the duration for reporting the CSI and the resource. For example, the first mapping relationship may be about a case where the CSI is reported in a specific duration T using a specific frequency domain resource. More specifically, the duration for reporting the CSI may be a duration for a plurality of terminal devices to report the CSI, and the duration for the plurality of terminal devices to report the CSI may be commonly indicated or respectively indicated; the number of times for reporting the CSI may be the number of times for a plurality of terminal devices to report the CSI, and the number of times for the plurality of terminal devices to report the CSI may be commonly indicated or respectively indicated.

In an embodiment, before S120, the method 100 further includes: transmitting, by the network device, information about the number of times for reporting the CSI and/or information about the duration for reporting the CSI to the plurality of terminal devices; before S220, the method 200 further includes: receiving, by the first terminal device, information about the number of times for reporting the CSI and/or information about a duration for reporting the CSI transmitted by the network device; where S120 includes: receiving, by the network device, the CSI of the first terminal device that is transmitted by the first terminal device according to the information about the number of times for reporting the CSI and/or the information about the duration for reporting the CSI; and S220 includes: transmitting, by the first terminal device, the CSI of the first terminal device to the network device according to the number of times for reporting the CSI and/or the duration for reporting the CSI.

Specifically, the information about the number of times for reporting the CSI and/or the information about the duration for reporting the CSI described above may be transmitted by the network device to the plurality of terminal devices in advance via a high-level signaling, or may be transmitted to the plurality of terminal devices via the DCI. For a specific manner to transmit the information about the number of times for reporting the CSI and/or the information about the duration for reporting the CSI, it may be protocol-provided or network-configured, which is not limited in the embodiments of the present disclosure.

Fourth item: indication information about an MCS for transmitting the CSI. The indication information about the modulation and coding scheme for transmitting the CSI is used to indicate a modulation and coding scheme used by the terminal device of the plurality of terminal devices that needs to report the CSI to report the CSI. The indication information about the modulation and coding scheme for transmitting the CSI may indicate a modulation and coding scheme for each of the plurality of terminal devices, or a modulation and coding scheme for all of the plurality of terminal devices, and a part of the plurality of terminal devices may is have the same modulation and coding scheme.

Fifth item: physical resource configuration information for reporting the CSI. The physical resource configuration information for reporting the CSI is used to indicate a physical resource used by the terminal device of the plurality of terminal devices that needs to report the CSI to report the CSI. Certainly, the physical resource configuration information for reporting the CSI may also be used to indicate a physical resource used by each of the plurality of terminal devices when it needs to report the CSI. Specifically, the physical resource configuration information for reporting the CSI is specifically used to indicate a physical resource respectively used by each of the plurality of terminal devices that needs to report the CSI to report the CSI, or the physical resource configuration information for reporting the CSI is specifically used to indicate a physical resource commonly used by all terminal devices of the plurality of terminal devices that need to report the CSI to report the CSI. More specifically, the physical resource respectively used by each of the plurality of terminal devices that needs to report the CSI to report the CSI includes a frequency domain resource and/or a time domain resource; or the physical resource commonly used by all terminal devices of the plurality of terminal devices that need to report the CSI to report the CSI includes a frequency domain resource and/or a time domain resource. Specifically, the frequency domain resource may be a physical resource block (Physical Resource Block, "PRB" for short) or a resource block group (Resource Block Group, "RBG" for short) used for reporting the CSI; the time domain resource may be a time domain resource unit used for reporting the CSI. For example, the time domain unit used for reporting the CSI may be a subframe, a time slot, an orthogonal frequency division multiplexing symbol (Orthogonal Frequency Division Multiplexing, "OFDM" for short), or the like; for another example, the time domain resource may be an offset between a time domain resource for the terminal device to report the CSI and a time domain resource for the network device to transmit the DCI; and the frequency domain resource may be an offset between a to frequency domain resource for the terminal device to report the CSI and a frequency domain resource for the network device to transmit the DCI, which is not limited in the embodiments of the present disclosure.

When the downlink control information transmitted by the network device to the terminal device includes the physical resource configuration information for reporting the CSI, S220 includes: determining, by the first terminal device, according to the physical resource configuration information for reporting the CSI included in the downlink control information, a first reporting resource for reporting the CSI of the first terminal device; and transmitting, by the first terminal device, the CSI of the first terminal device to the network device over the first reporting resource. S120 includes: receiving, by the network device, the CSI of the first terminal device transmitted by the first terminal device over a first reporting resource. Specifically, the determining, by the first terminal device, according to the physical resource configuration information for reporting the CSI included in the downlink control information, the first reporting resource for reporting the CSI of the first terminal device includes: determining, by the first terminal device, according to the physical resource configuration information for reporting the CSI, a first resource region for transmitting the CSI of the first terminal device; and determining, by the first terminal device, from resources of the first resource region, the first reporting resource for transmitting the CSI of the first terminal device; where the determining, by the first terminal device, from the resources of the first resource region, the first reporting resource for transmitting the CSI of the first terminal device may use the following five manners:

First manner: the first terminal device determines all resources in the first resource region as the first reporting resource.

Second manner: the first terminal device determines a plurality of physical resources randomly selected and included in the first resource region as the first reporting resource. For example, the plurality of physical resources may be a resource set, that is, the first resource region may include a plurality of resource sets, and the first terminal device may randomly select, from the plurality of resource sets included in the first resource region, a resource set as the first reporting resource for the first terminal to report the CSI.

Third manner, before S120, the method 100 further include: transmitting, by the network device, a physical resource index to the first terminal device, before the determining, by the first terminal device, from the resources of the first resource region, the first reporting resource for transmitting the CSI of the first terminal device, the method 200 further includes: receiving, by the first terminal device, a physical resource index transmitted by the network device, where the physical resource index is used to indicate a position of a resource for transmitting the CSI of the first terminal device; wherein the determining, by the first terminal device, from the resources of the first resource region, the first reporting resource for transmitting the CSI of the first terminal device includes; determining, by the first terminal device, from the resources of the first resource region according to the physical resource index, the first reporting resource for transmitting the CSI of the first terminal device. The receiving, by the network device, the CSI of the first terminal device transmitted by the first terminal device over the first reporting resource includes: receiving, by the network device, the CSI of the first terminal device transmitted over the first reporting resource determined by the first terminal device from resources of a first resource region according to the physical resource configuration information for reporting the CSI.

In an embodiment, the physical resource index may be obtained by a position of a bit for triggering reporting of the CSI corresponding to the first terminal device in the bit sequence for triggering reporting of the CSI included in the DCI indicated by the network device.

For example, the first reporting resource includes M physical resource sets, and one of the M physical resource sets is used for one terminal device to report the CSI. Before the network device transmits the downlink control information to the plurality of terminal devices, the network device may transmit, to each of the terminal devices, an index of the physical resource used by each of the terminal devices via a high-level signaling. For example, the network device may transmit, to each of the terminal devices, an index of the physical resource used by each of the terminal devices via a high-level layer signaling of log 2 (M) bits, and the first terminal device determines, from the M physical resource sets according to its own physical resource index, the first reporting resource for reporting the CSI of the first terminal device.

Fourth manner: before S120, the method 100 further includes: transmitting, by the network device, an index of the first terminal device to the first terminal device; before the determining, by the first terminal device, from the resources of the first resource region, the first reporting resource for transmitting the CSI of the first terminal device, the method 200 further includes: receiving, by the first terminal device, an index of the first terminal device transmitted by the network device, where the index of the first terminal device is used to indicate information about a position of the first terminal device in a terminal device that needs to report the CSI; where the determining, by the first terminal device, from the resources of the first resource region, the first reporting resource for transmitting the CSI of the first terminal device includes: determining, by the first terminal device, from the resources of the first resource region according to the index of the first terminal device, the first reporting resource for transmitting the CSI of the first terminal device; and transmitting, by the first terminal device, the CSI of the first terminal device to the network device over the first reporting resource; where, the receiving, by the network device, the CSI of the first terminal device transmitted by the first terminal device over the first reporting resource includes: receiving, by the network device, the CSI of the first terminal device transmitted over the first reporting resource determined by the first terminal device from resources of the first resource region according to the index of the first terminal device.

For example, any one of the plurality of terminal devices, such as the first terminal device, may receive, via the high-level signaling, the index of the first terminal device transmitted by the network device. If the number of CSI needed to report is L and the index of the first terminal device indicates that a position (sequence index) of a corresponding bit in the L terminal devices is P, with P being an integer greater than or equal to 0 and less than or equal to L, the first terminal device uses a physical resource whose index is P in the first reporting resource region as the first reporting resource.

Fifth manner: If the downlink control information includes the modulation and coding scheme for transmitting the CSI or the modulation and coding scheme for transmitting the CSI may not be carried in the downlink control information, the network device may transmit the modulation and coding scheme for transmitting the CSI to the plurality of terminal devices via other manners. The first terminal device calculates, according to the modulation and coding scheme for the first terminal device to report the CSI and a bit occupied by the CSI of the first terminal device, a size of a physical resource for reporting the CSI; and the first terminal device determines, from the resources of the first resource region according to the calculated size of the physical resource for reporting the CSI, the first reporting resource for transmitting the CSI of the first terminal device.

In an embodiment, the determining, by the first terminal device, from the resources of the first resource region, the first reporting resource for transmitting the CSI of the first terminal device includes: determining, by the first terminal device, resources in the first resource region that multiplexed with a second terminal device of the plurality of terminal devices that needs to report the CSI using a frequency division multiplexing (Frequency Division Multiplexing, "FDM" for short) mode, a time division multiplexing (Time Division Multiplexing, "TDM" for short) mode or a code division multiplexing (Code Division Multiplexing, "CDM" for short) mode as the first reporting resource. Specifically, if multiple terminal devices of the plurality of terminal devices need to report the CSI, when all of the multiple terminal devices need to occupy the resources of the first resource region, the multiple terminal devices multiplex the resources in the first resource region using FDM, TDM, or CDM. For a specific mode in which the resources in the first resource region are multiplexed, it may be protocol-provided or network-configured, which is not limited in the embodiments of the present disclosure.

Sixth item: resource configuration information for measuring the CSI. The resource configuration information for measuring the CSI is used to indicate a resource used by the terminal device of the plurality of terminal devices that needs to report the CSI to measure the CSI. Certainly, the resource configuration information for measuring the CSI may also indicate a resource used by each of the plurality of terminal devices to measure the CSI; in an embodiment, the resource configuration information for measuring the CSI may be one configuration information or a plurality of configuration information, which is not limited in the embodiments of the present disclosure. In an embodiment, the downlink control information may further include the number of times and/or a duration for measuring the CSI, or the like, thus the plurality of terminal devices may measure, according to the number of times and the duration for measuring the CSI, the CSI with the network device.

The resource configuration information for measuring the CSI includes at least one of a CSI, process, resource configuration information of a downlink pilot, and resource configuration information for measuring interference. For example, each CSI corresponds to a CSI-RS and an interference measurement resource (Interference Measurement Resource, "IMR" for short). Specifically, the downlink pilot resource may be a resource of the downlink pilot such as a cell-specific reference signal (Cell-specific Reference Signal, "CRS" for short), a demodulation reference signal (Demodulation Reference Signal, "DMRS" for short), a channel state information reference signal (Channel State Information Reference Signal, "CSI-RS" for short), or the like, and information for transmitting the downlink pilot resource may include a pilot antenna port configuration, a resource pattern (Pattern) configuration, a time-frequency physical resource, a scrambling sequence configuration, a transmission power configuration, or the like. For example, a time domain resource unit where the pilot is located may be an offset of the time domain resource unit where the DCI is located, and the scrambling sequence configuration may be an ID used when the sequence was generated. The resource configuration information for measuring the CSI indicates that the terminal device determines M resource configuration for measuring the CSI from N resource configuration for measuring the CSI, and the N resource configuration for measuring the CSI is indicated to the terminal device by the network side device via a high-level signaling in advance, where M is an integer greater than or equal to 1 and less than or equal to N.

In an embodiment, after S210 and before S220, the method 200 further includes: measuring, by the first terminal device, the CSI of the first terminal device. Specifically, the measurement may be a ease where the first terminal device measures channel quality information with the network device, or the first terminal device measures interference, or may be a pilot measurement, which is not limited in the embodiments of the present disclosure.

In an embodiment, when the downlink control information includes the resource configuration information for measuring the CSI, the measuring, by the first terminal device, the CSI of the first terminal device includes: determining, by the first terminal device, according to the resource configuration information for measuring the CSI, a first measurement resource for measuring the CSI of the first terminal device; and measuring, by the first terminal device, the CSI of the first terminal device according to the first measurement resource.

In an embodiment, the determining, by the first terminal device, according to the resource configuration information for measuring the CSI, the first measurement resource for measuring the CSI of the first terminal device includes: determining, by the terminal device, according to a first measurement resource configuration included in the resource configuration information for measuring the CSI, the first measurement resource for measuring the CSI of the first terminal device. Specifically, the network device may indicate the measurement resource configuration by means of a bitmap, or the first terminal device is notified of the measurement resource configuration by means of indication information.

In an embodiment, before the determining, by the first terminal device, according to the resource configuration information for measuring the CSI, the first measurement resource for measuring the CSI of the first terminal device, the method 200 further includes: receiving, by the terminal device, N first measurement resource configuration transmitted by the network device; where the determining, by the first terminal device, according to the resource configuration information for measuring the CSI, the first measurement resource for measuring the CSI of the first terminal device includes: determining, by the terminal device, according to indication information about measurement resource configuration included in the resource configuration information for measuring the CSI, M first measurement resource configuration from the N first measurement resource configuration; and determining, by the terminal device determines, according to the M first measurement resource configuration, the first measurement resource for measuring the CSI of the first terminal device, where M is an integer greater than or equal to 1 and less than or equal to N, and N is an integer greater than or equal to 1.

Specifically, the resource configuration information for the first terminal device to determine the first measurement resource for measuring the CSI of the first terminal device: the network device indicates the N first measurement resource configuration to the terminal device in advance, and then the network device uses a bit sequence of N bits to indicate that the M first measurement resource configuration from the N first measurement resource configuration is used for the CSI. For example, a bit value of 1 in the bit sequence indicates that a corresponding first measurement resource configuration may be used for CSI measurement; if M bits from the bit sequence have a bit value of 1, then M first measurement resource configuration may be determined, and the remaining N-M bits from the bit sequence have a bit value of 0. For another example, the indication information about the measurement resource configuration included in the resource configuration information for measuring the CSI may be an index of the resource configuration information, that is, the first terminal device may determine M resource configuration information thereof from N measurement configuration information, provided that the first terminal device obtains the index of the resource configuration information, and the first terminal device determines the first measurement resource according to the M resource configuration information.

Seventh item: transmission mode hypothesis information. That is, the measurement of the first terminal device with respect to the CSI with the network device is based on a transmission mode in which the network device transmits data to the first terminal device. However, when the first terminal device measures the CSI with the network device, there is no downlink data transmission yet. Therefore, the network device needs to carry the transmission mode hypothesis information in the downlink control information for transmitting to a plurality of terminal devices. Certainly, the transmission mode hypothesis information received by each of the terminal devices may be the same or different. Of course, the network device may transmit, before the CSI is measured by the plurality of terminal devices, the transmission mode hypothesis information to the plurality of terminal devices via a high-level signaling, which is not limited in the embodiments of the present disclosure. For example, the transmission mode hypothesis information may be at least one of the following: transmit diversity, open loop spatial multiplexing, quasi-open-loop multiple-input multiple-output (Multiple-Input Multiple-Output, "MIMO" for short), closed-loop MIMO transmission, dynamic point switching (Dynamic Point Switching, "DPS" for short), joint transmission (Joint Transmission, "JT" for short), cooperative scheduling (Cooperative Scheduling, "CS" for short), cooperative beamforming (Cooperative Beamforming, "CB" for short), single stream transmission, multiple stream transmission, multi-user-multiple-input multiple-output (Multi-User-Multiple-Input Multiple-Output, "MU-MIMO" for short), and single-user multiple-input multiple-output (Single-User Multiple-Input Multiple-Output, "SU-MIMO" for short). MU-MIMO may also include paired user information such as beam weights, precoding, or the like.

In an embodiment, the downlink control information includes the transmission mode hypothesis information, the measuring, by the first terminal device, the CSI of the first terminal device includes: determining, by the first terminal device, according to the transmission mode to hypothesis information, a transmission mode for transmitting downlink data; and measuring, by the first terminal device, based on the transmission mode for transmitting the downlink data, the CSI of the first terminal device.

Eighth item: information about a type for reporting the CSI. The information about the type for reporting the CSI is used to indicate a type for the terminal device of the plurality of terminal devices that needs to report the CSI to report the CSI. For example, the type includes codebook-based CSI feedback, non-codebook-based CSI feedback, channel state information reference signal resource index (CSI-RS Resource Index, "CRI" for short)-based CSI feedback, enhanced port codebook-based CSI feedback. The codebook-based feedback refers to that the CSI includes a PMI, the non-codebook-based feedback refers to that the CSI does not include a PMI, the CRI-based feedback refers to that the CSI includes a resource index, and the enhanced port codebook-based CSI feedback refers to that the CSI does not include a resource index.

In an embodiment, when the downlink control information includes the information about the type for reporting the CSI, the measuring, by the first terminal device, the CSI of the first terminal device includes: determining, by the first terminal device, according to the information about the type for reporting the CSI, a type for transmitting the CSI of the first terminal device to the network device; and measuring, by the first terminal device, the CSI of the first terminal device based on the type of the CSI of the first terminal device. In this way, the first terminal device may make a measurement according to the information about the type for reporting the CSI without measuring all parameters related to the channel state information.

Ninth item: codebook indication information. The codebook indication information is used to indicate a codebook based on which the terminal device of the plurality of terminal devices that needs to report the CSI measures the CSI and reports the CSI. Certainly, the codebook indication information may also indicate a codebook based on which each of the plurality of terminal devices measures the CSI and reports the CSI. In an embodiment, the codebook indication information may indicate a codebook commonly used by the plurality of terminal devices, and the codebook indication information may also indicate codebooks respectively used by the plurality of terminal devices. The codebooks used by each of the plurality of terminal devices may be the same or different; the codebook indication information may indicate one or more codebooks, which is not limited in the embodiments of the present disclosure.

In an embodiment, when the downlink control information includes the codebook indication information, the measuring, by the first terminal device, the CSI of the first terminal device includes: determining, by the first terminal device, according to the codebook indication information, a codebook based on which the CSI of the first terminal device is measured; measuring, by the first terminal device, the CSI of the first terminal device according to the codebook based on which the CSI of the first terminal device is measured; and transmitting, by the first terminal device, the CSI of the first terminal device to the network device according to the codebook based on which the CSI of the first terminal device is measured. That is, the first terminal device determines, according to the codebook indication information, a codebook used by the first terminal device to measure the CSI with the network device, and the first terminal device performs measurement and reporting according to the determined codebook. A plurality of codebooks may be stored by the network device and the terminal device in advance, and the first terminal device may select, according to the codebook indication information, a codebook for measuring the CSI from the plurality of codebooks. The codebook is a precoding matrix set which is stored at both the transmitting end and the receiving end. The channel adopts incomplete feedback, and the receiving end adopts and generates, according to the feedback information, a PMI sequence number for the transmitting end by a certain criterion. Each PMI corresponds to a precoding matrix in the codebook.

Tenth item: codebook subset constraint information. The codebook subset constraint information is used to indicate a codeword based on which the terminal device of the plurality of terminal devices that needs to report the CSI measures the CSI and reports the CSI.

In an embodiment, when the downlink control information includes the codebook subset constraint information, the measuring, by the first terminal device, the CSI of the first terminal device includes: determining, by the first terminal device, according to the codebook subset constraint information, a codeword based on which the CSI of the first terminal device is measured; and measuring, by the first terminal device, the CSI of the first terminal device according to the codeword for measuring the CSI of the first terminal device; the transmitting, by the first terminal device, the CSI of the first terminal device to the network device includes: In transmitting, by the first terminal device, the CSI of the first terminal device to the network device according to the codeword based on which the CSI of the first terminal device is measured.

It should be understood that the ten items of information included in the downlink control information according to the embodiments of the present disclosure may be entirely included or partially included. It is possible that the plurality of terminal devices may have obtained a part of the information, so there is no need for the network device to continue notifying the terminal device using the downlink control information. Certainly, in the present disclosure, some information included in the downlink control information is described only for the convenience of exemplification, and the downlink control information may further include other information for measuring the CSI and reporting the CSI. Details will not be described in order to avoid redundancy.

It should also be understood that the information related to measuring of the CSI and reporting of the CSI mentioned in the embodiments of the present disclosure may be transmitted to the plurality of terminal devices via the DCI, or may be transmitted to the plurality of terminal devices before the DCI is transmitted. That is also to say, the manner in which the information related to measuring of the CSI and reporting of the CSI is transmitted is not limited in the embodiments of the present disclosure, and the embodiments of the present disclosure are not limited thereto. The information for measuring the CSI and reporting the CSI mentioned in the embodiments of the present disclosure may be information related to one terminal device, or may be information related to a plurality of terminal devices, which is not limited in the embodiments of the present disclosure.

The methods for transmitting channel state information according to the embodiments of the present disclosure are described above with reference to FIG. 1 and FIG. 2. The apparatuses for transmitting channel state information according to the embodiments of the present disclosure will be described below with reference to FIG. 3 to FIG. 6.

Figure 3:
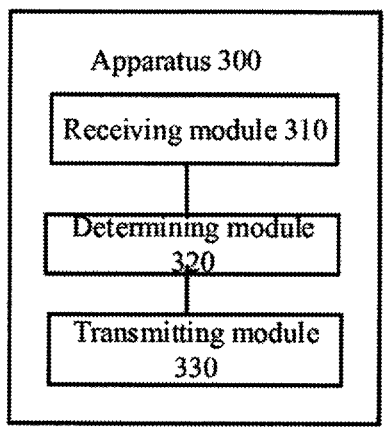
FIG. 3 is a schematic block diagram of an apparatus for transmitting channel state information according to an embodiment of the present disclosure.

FIG. 3 shows a schematic block diagram of an apparatus 300 for transmitting channel state information according to an embodiment of the present disclosure. The apparatus may be, for example, the terminal device in the method 200, and the apparatus 300 includes:

a receiving module 310, configured to receive downlink control information DCI to transmitted by a network device;

a determining module 320, configured to determine, according to the DCI, whether it is necessary to report CSI; and a transmitting module 330, configured to: when the determining module 320 determines that it is necessary to report the CSI, transmit the CSI of the apparatus to the network device.

In an embodiment, the DCI is used to indicate whether each of a plurality of terminal devices reports the CSI, and the plurality of terminal devices includes the apparatus.

In an embodiment, the DCI includes at least one of the following: a bit sequence for triggering reporting of the CSI, information about the number of times for reporting the CSI, information about a duration for reporting the CSI, physical resource configuration information for reporting the CSI, resource configuration information for measuring the CSI, indication information about a modulation and coding scheme MCS for transmitting the CSI, transmission mode hypothesis information, information about a type for reporting the CSI, codebook indication information, and codebook subset constraint information;

where a bit in the bit sequence for triggering reporting of the CSI is used to indicate whether each of a plurality of terminal devices reports the CSI, the plurality of terminal devices includes the apparatus, the information about the number of times for reporting the CSI is used to indicate the number of times for the apparatus to report the CSI, the information about the duration for reporting the CSI is used to indicate a duration for the apparatus to report the CSI, the physical resource configuration information for reporting the CSI is used to indicate a physical resource used by the apparatus to report the CSI, the resource configuration information for measuring the CSI is used to indicate a resource used by the apparatus to measure the CSI, the indication information about the MCS for transmitting the CSI is used to indicate a modulation and coding scheme used by the apparatus to report the CSI, the transmission mode hypothesis information is used to indicate a transmission mode used by the network device to transmit downlink data to the apparatus, the information about the type for reporting the CSI is used to indicate a type for the apparatus to report the CSI, the codebook indication information is used to indicate a codebook based on which the apparatus measures the CSI and reports the CSI, and the codebook subset constraint information is used to indicate a codeword based on which the apparatus measures the CSI and reports the CSI.

In an embodiment, if the bit sequence for triggering reporting of the CSI includes a plurality of bits, each bit in the bit sequence for triggering reporting of the CSI is used to indicate whether one of the plurality of terminal devices reports the CSI.

In an embodiment, the physical resource configuration information for reporting the CSI is specifically used to indicate a respective physical resource used by each of the plurality of terminal devices that needs to report the CSI to report the CSI, or the physical resource configuration information for reporting the CSI is specifically used to indicate a physical resource commonly used by all terminal devices of the plurality of terminal devices that need to report the CSI to report the CSI.

In an embodiment, the physical resource configuration information for reporting the CSI, is used to indicate a frequency domain resource and/or a time domain resource used by the apparatus to report the CSI.

In an embodiment, the resource configuration information for measuring the CSI includes at least one of a CSI process, resource configuration information of a downlink pilot, and resource configuration information for measuring interference.

In an embodiment, the receiving module 310 is further configured to: before the DCI transmitted by the network device is received, receive a group identifier Group ID or a group CSI radio network temporary identifier Group-CSI-RNTI transmitted by the network device;

the transmitting module 330 is specifically configured to receive, according to the Group ID or the Group-CSI-RNTI, the DCI transmitted by the network device.

In an embodiment, the DCI includes the bit sequence for triggering reporting of the CSI, the receiving module 310 is further configured to:

before it is determined, according to the DCI, whether it is necessary to report the CSI, receive index information of the apparatus transmitted by the network device, where the index information of the apparatus is used to indicate a position of a bit for triggering reporting of the CSI corresponding to the apparatus in the bit sequence for triggering reporting of the CSI;

the determining module 320 is specifically configured to:

determine, according to the index information of the apparatus, the bit for triggering to reporting of the CSI corresponding to the apparatus; and determine, according to the bit for triggering reporting of the CSI corresponding to the apparatus, whether it is necessary to report the CSI.

In an embodiment, the DCI includes indication information about the MCS used for reporting the CSI, the determining module 320 is further configured to, before the CSI of the apparatus is transmitted to the network device, determine, according to the indication information about the MCS used for reporting the CSI, the modulation and coding scheme used for reporting the CSI;

the transmitting module 330 is specifically further configured to transmit, according to the MCS used for reporting the CSI, the CSI of the apparatus to the network device.

In an embodiment, the DCI includes the physical resource configuration information for reporting the CSI, the determining module 320 is further configured to, before the CSI of the apparatus is transmitted to the network device, determine, according to the physical resource configuration information for reporting the CSI, a first reporting resource for reporting the CSI of the apparatus; the transmitting module 330 is specifically further configured to transmit the CSI of the apparatus to the network device over the first reporting resource.

In an embodiment, the determining module 320 is specifically further configured to: determine, according to the physical resource configuration information for reporting the CSI, a first resource region for transmitting the CSI of the apparatus; and determine, from resources of the first resource region, the first reporting resource for transmitting the CSI of the apparatus.

In an embodiment, the determining module 320 is specifically further configured to: determine all resources in the first resource region as the first reporting resource; or determine a plurality of physical resources randomly selected from the first resource region as the first reporting resource.

In an embodiment, the receiving module 310 is further configured to: before the apparatus determines, from the resources of the first resource region, the first reporting resource for transmitting the CSI of the apparatus, receive a physical resource index transmitted by the network device, where the physical resource index is used to indicate a position of a resource for transmitting the CSI of the apparatus; the determining module 320 is specifically configured to: determine, from the resources of the first resource region according to the physical resource index, the first reporting resource for transmitting the CSI of the apparatus.

In an embodiment, the receiving module 310 is further configured to: before the apparatus determines, from the resources of the first resource region, the first reporting resource for transmitting the CSI of the apparatus, receive an index of the apparatus transmitted by the network device, where the index of the apparatus is used to indicate information about a position of the apparatus in a terminal device that needs to report the CSI; the determining module 320 is specifically configured to: determine, from the resources of the first resource region according to the index of the apparatus, the first reporting resource for transmitting the CSI of the apparatus.

In an embodiment, the determining module 320 is specifically configured to: calculate, according to the MCS for the apparatus to report the CSI and a bit occupied by the CSI of the apparatus, a size of a physical resource for reporting the CSI; and determine, from the resources of the first resource region according to the calculated size of the physical resource for reporting the CSI, the first reporting resource for transmitting the CSI of the apparatus.

In an embodiment, the first reporting resource and a second physical resource used by a second terminal device that needs to report the CSI indicated via the DCI to report the CSI are multiplexed by a frequency division multiplexing FILM mode, a time division multiplexing TDM mode or a code division multiplexing CDM mode.

In an embodiment, the apparatus further includes: a measuring module, configured to, before the CSI of the apparatus is transmitted to the network device according to the DCI, measure the CSI of the apparatus.

In an embodiment, the DCI includes the resource configuration information for measuring the CSI, the determining module 320 is specifically configured to determine, according to the resource configuration information for measuring the CSI, a first measurement resource for measuring the CSI of the apparatus; and the measuring module is specifically configured to measure the CSI of the apparatus according to the first measurement resource.

In an embodiment, the determining module 320 is specifically configured to: determine, according to a first measurement resource configuration included in the resource configuration information for measuring the CSI, the first measurement resource for measuring the CSI of the apparatus.

In an embodiment, the receiving module 310 is specifically configured to:

before the first measurement resource for measuring the CSI of the apparatus is determined according to the resource configuration information for measuring the CSI, receive N first measurement resource configuration transmitted by the network device;

the determining module 320 is specifically further configured to determine, according to indication information about measurement resource configuration included in the resource configuration information for measuring the CSI, M first measurement resource configuration from the N first measurement resource configuration; and determine, according to the M first measurement resource configuration, the first measurement resource for measuring the CSI of the apparatus, where M is an integer greater than or equal to 1 and less than or equal to N, and N is an integer greater than or equal to 1.

In an embodiment, the DCI includes the transmission mode hypothesis information, the determining module 320 is further configured to determine, according to the transmission mode hypothesis information, a transmission mode used by the network device to transmit downlink data; and the measuring module is specifically further configured to measure, based on the transmission mode used by the network device to transmit the downlink data, the CSI of the apparatus.

In an embodiment, the DCI includes the information about the type for reporting the CSI, the determining module 320 is specifically configured to determine, according to the information about the type for reporting the CSI, a type for transmitting the CSI of the apparatus to the network device; and the measuring module is specifically further configured to measure the CSI of the apparatus based on the type of the CSI of the apparatus.

In an embodiment, the DCI includes the codebook indication information, the determining module 320 is further configured to determine, according to the codebook indication information, a codebook based on which the CSI of the apparatus is measured; the measuring module is specifically further configured to measure the CSI of the apparatus according to the codebook based on which the CSI of the apparatus is measured; and the transmitting module 330 is specifically further configured to transmit the CSI of the apparatus to the network device according to the codebook based on which the CSI of the apparatus is measured.

In an embodiment, the DCI includes the codebook subset constraint information, the determining module 320 is further configured to determine, according to the codebook subset constraint information, a codeword based on which the CSI of the apparatus is measured; the is measuring module is specifically further configured to measure the CSI of the apparatus according to the codeword based on which the CSI of the apparatus is measured; and the transmitting module 330 is specifically further configured to transmit the CSI of the apparatus to the network device according to the codeword based on which the CSI of the apparatus is measured.

In an embodiment, the receiving module 310 is further configured to: before the CSI of the apparatus is transmitted to the network device according to the DCI, receive information about the number of times for reporting the CSI and/or information about a duration for reporting the CSI transmitted by the network device; the determining module 320 is further configured to determine, according to the information about the number of times for reporting the CSI and/or the information about the duration for reporting the CSI, the number of times for reporting the CSI and/or the duration for reporting the CSI; and the transmitting module 330 is specifically further configured to transmit the CSI of the apparatus to the network device according to the number of times for reporting the CSI and/or the duration for reporting the CSI.

In an embodiment, the CSI includes at least one of a pre-coding matrix index PMI, a rank index RI, and a channel quality index CQI.

Figure 4:
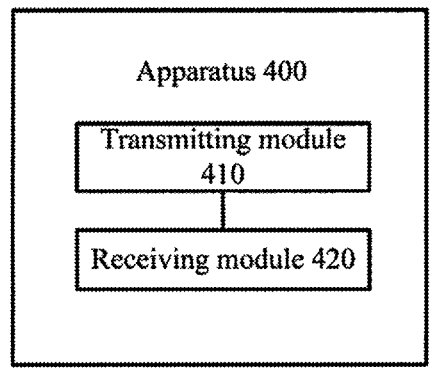
FIG. 4 is a schematic block diagram of another apparatus for transmitting channel state information according to an embodiment of the present disclosure.

FIG. 4 shows a schematic block diagram of another apparatus 400 for transmitting channel state information according to an embodiment of the present disclosure. The apparatus may be, for example, the network device in the method 100, and the apparatus 400 includes:

a transmitting module 410, configured to transmit downlink control information DCI to a first terminal device; and a receiving module 420, configured to receive CSI of the first terminal device transmitted by the first terminal device according to the DCI.

In an embodiment, the DCI is used to indicate whether each of a plurality of terminal devices reports the CSI, and the plurality of terminal devices includes the first terminal device.

In an embodiment, the DCI includes at least one of the following: a bit sequence for triggering reporting of the CSI, information about the number of times for reporting the CSI, information about a duration for reporting the CSI, physical resource configuration information for reporting the CSI, resource configuration information for measuring the CSI, indication information about a modulation and coding scheme MCS for transmitting the CSI, transmission mode hypothesis information, information about a type for reporting the CSI, codebook indication information, and codebook subset constraint information;

where a bit in the bit sequence for triggering reporting of the CSI is used to indicate whether each of a plurality of terminal devices reports the CSI, the plurality of terminal devices includes the first terminal device, the information about the number of times for reporting the CSI is used to indicate the number of times for a terminal device of the plurality of terminal devices that needs to report the CSI to report the CSI, the information about the duration for reporting the CSI is used to indicate a duration for the terminal device of the plurality of terminal devices that needs to report the CSI to report the CSI, the physical resource configuration information for reporting the CSI is used to indicate a physical resource used by the terminal device of the plurality of terminal devices that needs to report the CSI to report the CSI, the resource configuration information for measuring the CSI is used to indicate a resource used by the terminal device of the plurality of terminal devices that needs to report the CSI to measure the CSI, the indication information about the MCS for transmitting the CSI is used to indicate a modulation and coding scheme used by the terminal device of the plurality of terminal devices that needs to report the CSI to report the CSI, the transmission mode hypothesis information is used to indicate a transmission mode used by the apparatus to transmit downlink data to the terminal device of the plurality of terminal devices that needs to report the CSI, the information about the type for reporting the CSI is used to indicate a type for the terminal device of the plurality of terminal devices that needs to report the CSI to report the CSI, the codebook indication information is used to indicate a codebook based on which the terminal device of the plurality of terminal devices that needs to report the CSI measures the CSI and reports the CSI, and the codebook subset constraint information is used to indicate a codeword based on which the terminal device of the plurality of terminal devices that needs to report the CSI measures the CSI and reports the CSI.

In an embodiment, if the bit sequence for triggering reporting of the CSI includes a plurality of bits, each bit in the bit sequence for triggering reporting of the CSI is used to indicate whether one of the plurality of terminal devices reports the CSI.

In an embodiment, the physical resource configuration information for reporting the CSI is specifically used to indicate a respective physical resource used by each of the plurality of terminal devices that needs to report the CSI to report the CSI, or the physical resource configuration information for reporting the CSI is specifically used to indicate a physical resource commonly used by all terminal devices of the plurality of terminal devices that need to report the CSI to report the CSI.

In an embodiment, the respective physical resource used by each of the plurality of terminal devices that needs to report the CSI to report the CSI includes a frequency domain resource and/or a time domain resource; and/or the physical resource commonly used by all terminal devices of the plurality of terminal devices that need to report the CSI to report the CSI includes a frequency domain resource and/or a time domain resource.

In an embodiment, the resource configuration information for measuring the CSI includes at least one of a CSI process, resource configuration information of a downlink pilot, and resource configuration information for measuring interference.

In an embodiment, the transmitting module 410 is further configured to:

transmit, to the plurality of terminal devices, the DCI that is performed with cyclic redundancy check CRC scrambling via a group identifier Group ID or a group CSI radio network temporary identifier Group-CSI-RNTI, where the Group ID is used to indicate identity information commonly used by the plurality of terminal devices, and the Group-CSI-RNTI is used to indicate radio network temporary identifier information commonly used by the plurality of terminal devices.

In an embodiment, the transmitting module 410 is further configured to:

before the DCI is transmitted to the plurality of terminal devices, transmit the Group ID or the Group-CSI-RNTI to the plurality of terminal devices so that the plurality of terminal devices receive, according to the Group ID or the Group-CSI-RNTI, the DCI that is performed with the CRC scrambling via the Group ID or the group CSI radio network temporary identifier Group-CSI-RNTI.

In an embodiment, the DCI includes the bit sequence for triggering reporting of the CSI, the transmitting module 410 is further configured to: before the CSI of the first terminal device transmitted by the first terminal device according to the DCI is received, transmit index information of the first terminal device to the first terminal device, where the index information of the first terminal device is used to indicate a position of a bit for triggering reporting of the CSI corresponding to the first terminal device in the bit sequence for triggering reporting of the CSI, so that the first terminal device determines, according to the index information of the first terminal device, the bit for triggering reporting of the CSI corresponding to the first terminal device, and determines, according to the bit for triggering reporting of the CSI, whether it is necessary to report the CSI of the first terminal device.

In an embodiment, the DCI includes the physical resource configuration information for reporting, the CSI, the receiving module 420 is specifically configured to: receive the CSI of the first terminal device transmitted by the first terminal device over a first reporting resource, where the first reporting resource is determined by the first terminal device according to the physical resource configuration information for reporting the CSI included in the DCI.

In an embodiment, the transmitting module 410 is further configured to: before the CSI of the first terminal device transmitted by the first terminal device according to the DCI is received, transmit a physical resource index to the first terminal device, where the physical resource index is used to indicate a position of a resource for transmitting the CSI of the first terminal device; the receiving module 420 is specifically further configured to: receive the CSI of the first terminal device transmitted over the first reporting resource determined by the first terminal device from resources of a first resource region according to the physical resource configuration information for reporting the CSI, where the first resource region is determined according to the physical resource configuration information for reporting the CSI.

In an embodiment, the transmitting module 410 is further configured to:

before the CSI of the first terminal device transmitted by the first terminal device according to the DCI is received, transmit an index of the first terminal device to the first terminal device, where the index of the first terminal device is used to indicate information about a position of the first terminal device in the terminal device that needs to report the CSI; the receiving module 420 is specifically configured to: receive the CSI of the first terminal device transmitted over the first reporting resource determined by the first terminal device from resources of the first resource region according to the index of the first terminal device, where the first resource region is determined according to the physical resource configuration information for reporting the CSI.

In an embodiment, the transmitting module 410 is further configured to: before the is downlink control information DCI is transmitted to the first terminal device, transmit N first measurement resource configuration to the first terminal device, so that the terminal device determines, according to indication information about measurement resource configuration included in the resource configuration information for measuring the CSI, M first measurement resource configuration from the N first measurement resource configuration, and determines, according to the M first measurement resource configuration, the first measurement resource for measuring the CSI of the first terminal device, where M is an integer greater than or equal to 1 and less than or equal to N, and N is an integer greater than or equal to 1.

In an embodiment, the transmitting module 410 is further configured to: before the CSI of the first terminal device transmitted by the first terminal device according to the DCI is received, transmit, to the plurality of terminal devices, information about the number of times for reporting the CSI and/or information about a duration for reporting the CSI; the receiving module 420 is specifically configured to: receive the CSI of the first terminal device transmitted by the first terminal device according to the information about the number of times for reporting the CSI and/or the information about the duration for reporting the CSI and the DCI.

In an embodiment, the CSI includes at least one of a precoding matrix index PMI, a rank index RI, and a channel quality index CQI.

Figure 5:
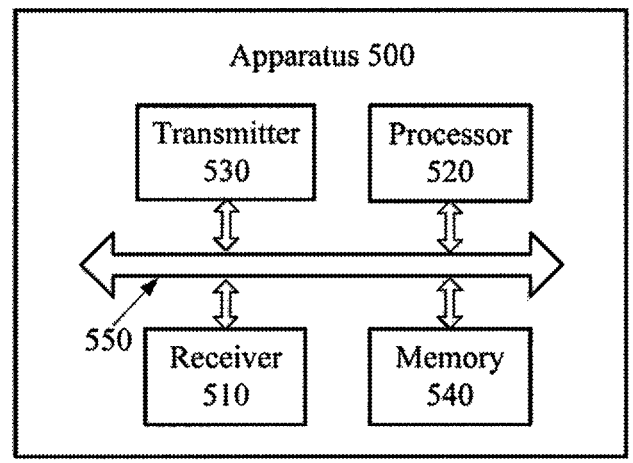
FIG. 5 is a schematic block diagram of another apparatus for transmitting channel state information according to an embodiment of the present disclosure.

FIG. 5 shows a schematic block diagram of an apparatus 500 for transmitting channel state information according to an embodiment of the present disclosure. For example, the apparatus 500 may be the terminal device in the method 200, and the apparatus 500 includes a receiver 510, a processor 520, a transmitter 530, a memory 540, and a bus system 550. The receiver 510, the processor 520, the transmitter 530 and the memory 540 are connected via the bus system 550, where the memory 540 is configured to store an instruction, and the processor 520 is configured to execute the instruction stored in the memory 540 to control the receiver 510 to receive a signal or to control the transmitter 530 to transmit a signal.

The receiver 510 is configured to receive downlink control information DCI transmitted by a network device; the processor 520 is configured to determine, according to the DCI, whether it is necessary to report CSI; and the transmitter 530 is configured to: when the processor 520 determines that it is necessary to report the CSI, transmit the CSI of the apparatus to the network device.

It should be understood that the apparatus 500 may be specifically the terminal device in the method 200 according to the above-described embodiments, and may be configured to perform various steps and/or processes corresponding to the terminal device. In an embodiment, the memory 540 may include a read-only memory and a random access memory, and provides instructions and data to the processor. A portion of the memory may also include a non-volatile random access memory. For example, the memory may also be stored with device type information. The processor 520 may be configured to execute the instruction stored in the memory, and when the processor executes the instruction, the processor may perform various steps corresponding to the terminal device in the method 500 according to above-described embodiments.

Figure 6:
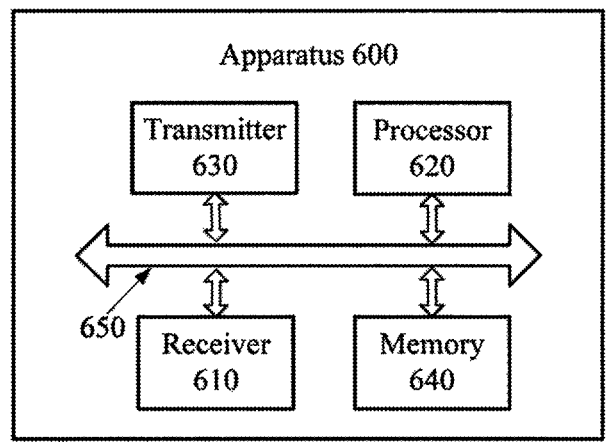
FIG. 6 is a schematic block diagram of another apparatus for transmitting channel state information according to an embodiment of the present disclosure.

FIG. 6 shows a schematic block diagram of an apparatus 600 for transmitting channel state information according to an embodiment of the present disclosure. For example, the apparatus 600 may be the network device in the method 100, and the apparatus 600 includes a receiver 610, a processor 620, a transmitter 630, a memory 640, and a bus system 650. The receiver 610, the processor 620, the transmitter 630 and the memory 640 are connected via the bus system 650, where the memory 640 is configured to store an instruction, and the processor 620 is configured to execute the instruction stored in the memory 640 to control the receiver 610 to receive a signal or to control the transmitter 630 to transmit a signal.

The transmitter 630 is configured to transmit downlink control information DCI to a first terminal device. The receiver 610 is configured to receive CSI of the first terminal device transmitted by the first terminal device according to the DCI.

It should be understood that the apparatus 600 may be specifically the network device in the method 100 according to the above-described embodiments, and may be configured to perform various steps and/or processes corresponding to the network device. In an embodiment, the memory 640 may include a read-only memory and a random access to memory, and provides instructions and data to the processor. A portion of the memory may also include a non-volatile random access memory. For example, the memory may also be stored with device type information. The processor 620 may be configured to execute the instruction stored in the memory, and when the processor executes the instruction, the processor may perform various steps corresponding to the network device in the method 100 according to above-described embodiments.

It should be understood that, in the embodiments of the present disclosure, the processor 520 and the processor 620 may be a central processing unit (Central Processing Unit, CPU), and the processor may also be other general-purpose processors, digital signal processors (DSP), application specific integrated circuits (ASIC), field programmable gate array (FPGA) or other programmable logic devices, discrete gates or transistor logic devices, discrete hardware components, or the like. The general-purpose processor may be a microprocessor or the processor may also be any conventional processors, or the like.

It should be understood that the term such as "and/or" herein is merely an association relationship describing associated objects, which indicates that there may be three relationships, for example, A and/or B may indicate presence of A only, of both A and B, and of B only. In addition, the character "/" herein generally indicates that contextual objects have an "or" relationship.

It should be understood that, in various embodiments of the present disclosure, the sequence numbers of the above processes do not imply an execution order. The execution order of the processes should be determined by their functions and internal logic, but is not intended to limit an implementation in the embodiments of the present disclosure.

It may be known to persons of ordinary skill in the art that, the units and the algorithm steps of each example that are described with reference to the embodiments disclosed herein may be implemented by electronic hardware or a combination of computer software and electronic hardware. The situation whether these functions are performed by hardware or software depends on specific applications and design constraints of the technical solution. Persons of ordinary skill in the art may implement the described functions by using different methods for each specific application, and such implementation should not be regarded as going beyond the scope of the present disclosure.

It may be clearly understood by persons of ordinary skill in the art that, for the purpose of convenient and brief description, reference may be made to the corresponding process in the foregoing method embodiments for detailed working processes of the foregoing systems, apparatuses, and units, and details will not be described herein again.

In several embodiments provided in the present application, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, that is, may be located in one position, or may be distributed on multiple network units. A part or all of the units may be selected according to actual needs to achieve the objectives of the scheme in the embodiments.

In addition, functional units in the embodiments of the present disclosure may be integrated into one processing unit, or each of the units may exist alone physically, or two or more units are integrated into one unit.

If implemented in a form of a software functional unit and sold or used as an independent product, the functions may be stored in a computer-readable storage medium. Based on such an understanding, the technical solution of the present disclosure essentially, or the part contributing to the prior art, or a part of the technical solution may be implemented in a form of a software product. The computer software product is stored in a storage medium, and includes several instructions for enabling a computer device (which may be a personal computer, a server, or a network device, or the like) to perform all or a part of the steps of the methods described in the embodiments of the present disclosure. The foregoing storage medium includes: any medium that can store program codes, such as a USB flash disk, a mobile hard disk, a read-only memory (ROM, Read-Only Memory), a random access memory (RAM, Random Access Memory), a magnetic disk, or an optical disc, or the like.

The above descriptions are merely specific embodiments of the present disclosure; however, the protection scope of the present disclosure is not limited thereto. Any modification or replacement that may be readily envisaged of by persons of ordinary skill in the art within the technical scope disclosed in the present disclosure should fall into the protection scope of the present disclosure. Thus, the protection scope of the present disclosure shall be subject to the claims.

What is claimed is:

1. A method for transmitting channel state information (CSI), comprising:
   receiving, by a first terminal device, downlink control information (DCI) transmitted by a network device;
   determining, by the first terminal device, according to the DCI, whether it is necessary to report CSI; and
   when the first terminal device determines that it is necessary to report the CSI, transmitting, by the first terminal device, the CSI of the first terminal device to the network device;
   wherein before the transmitting, by the first terminal device, the CSI of the first terminal device to the network device according to the DCI, the method further comprising:
   measuring, by the first terminal device, the CSI of the first terminal device;
   wherein the DCI comprises resource configuration information for measuring the CSI,
   wherein the measuring, by the first terminal device, the CSI of the first terminal device comprises:
   determining, by the first terminal device, according to the resource configuration information for measuring the CSI, a first measurement resource for measuring the CSI of the first terminal device; and
   measuring, by the first terminal device, the CSI of the first terminal device according to the first measurement resource;
   wherein the determining, by the first terminal device, according to the resource configuration information for measuring the CSI, the first measurement resource for measuring the CSI of the first terminal device comprises:

determining, by the first terminal device, according to a first measurement resource configuration comprised in the resource configuration information for measuring the CSI, the first measurement resource for measuring the CSI of the first terminal device;

wherein before the determining, by the first terminal device, according to the resource configuration information for measuring the CSI, the first measurement resource for measuring the CSI of the first terminal device, the method further comprising:

receiving, by the first terminal device, N first measurement resource configuration transmitted by the network device;

wherein the determining, by the first terminal device, according to the resource configuration information for measuring the CSI, the first measurement resource for measuring the CSI of the first terminal device comprises:

determining, by the first terminal device, according to indication information about measurement resource configuration comprised in the resource configuration information for measuring the CSI, M first measurement resource configuration from the N first measurement resource configuration; and determining, by the first terminal device, according to the M first measurement resource configuration, the first measurement resource for measuring the CSI of the first terminal device, wherein M is an integer greater than or equal to 1 and less than or equal to N, and N is an integer greater than 1.

2. The method according to claim 1, wherein the DCI is used to indicate whether each of a plurality of terminal devices reports the CSI, and the plurality of terminal devices comprises the first terminal device.

3. The method according to claim 1, wherein the DCI further comprises at least one of the following: a bit sequence for triggering reporting of the CSI, information about the number of times for reporting the CSI, information about a duration for reporting the CSI, physical resource configuration information for reporting the CSI, indication information about a modulation and coding scheme (MCS) for transmitting the CSI, transmission mode hypothesis information, information about a type for reporting the CSI, codebook indication information, and codebook subset constraint information;

wherein a bit in the bit sequence for triggering reporting of the CSI is used to indicate whether each of a plurality of terminal devices reports the CSI, the plurality of terminal devices comprises the first terminal device, the information about the number of times for reporting the CSI is used to indicate the number of times for the first terminal device to report the CSI, the information about the duration for reporting the CSI is used to indicate a duration for the first terminal device to report the CSI, the physical resource configuration information for reporting the CSI is used to indicate a physical resource used by the first terminal device to report the CSI, the resource configuration information for measuring the CSI is used to indicate a resource used by the first terminal device to measure the CSI, the indication information about the MCS for transmitting the CSI is used to indicate a modulation and coding scheme used by the first terminal device to report the CSI, the transmission mode hypothesis information is used to indicate a transmission mode used by the network device to transmit downlink data to the first terminal device, the information about the type for reporting the CSI is used to indicate a type for the first terminal device to report the CSI, the codebook indication information is used to indicate a codebook based on which the first terminal device measures the CSI and reports the CSI, and the codebook subset constraint information is used to indicate a codeword based on which the first terminal device measures the CSI and reports the CSI.

4. The method according to claim 3, wherein the physical resource configuration information for reporting the CSI is specifically used to indicate a respective physical resource used by each of the plurality of terminal devices that needs to measure the CSI to report the CSI, or the physical resource configuration information for reporting the CSI is specifically used to indicate a physical resource commonly used by all terminal devices of the plurality of terminal devices that need to measure the CSI to report the CSI.

5. The method according to claim 3, wherein before the receiving, by the first terminal device, the DCI transmitted by the network device, further comprising:

receiving, by the first terminal device, a group identifier (Group ID) or a group CSI radio network temporary identifier (Group-CSI-RNTI) transmitted by the network device;

the receiving, by the first terminal device, the DCI transmitted by the network device comprises:

receiving, by the first terminal device, according to the Group ID or the Group-CSI-RNTI, the DCI transmitted by the network device.

6. The method according to claim 3, wherein the DCI comprises at least one of the bit sequence for triggering reporting of the CSI and the indication information about the MCS used for reporting the CSI, when the DCI comprises the bit sequence for triggering reporting of the CSI, before the determining, by the first terminal device, according to the DCI, whether it is necessary to report the CSI, the method further comprises:

receiving, by the first terminal device, index information of the first terminal device transmitted by the network device, wherein the index information of the first terminal device is used to indicate a position of a bit for triggering reporting of the CSI corresponding to the first terminal device in the bit sequence for triggering reporting of the CSI;

wherein the determining, by the first terminal device, according to the DCI, whether it is necessary to report the CSI comprises:

determining, by the first terminal device, according to the index information of the first terminal device, the bit for triggering reporting of the CSI corresponding to the first terminal device; and determining, by the first terminal device, according to the bit for triggering reporting of the CSI corresponding to the first terminal device, whether it is necessary to report the CSI;

when the DCI comprises the indication information about the MCS used for reporting the CSI, before the transmitting, by the first terminal device, the CSI of the first terminal device to the network device, the method further comprises:

determining, by the first terminal device, according to the indication information about the MCS used for reporting the CSI, the modulation and coding scheme used for reporting the CSI;

wherein the transmitting, by the first terminal, the CSI of the first terminal device to the network device comprises:
transmitting, by the first terminal device, according to the MCS used for reporting the CSI, the CSI of the first terminal device to the network device.

7. The method according to claim 3, wherein the DCI comprises the physical resource configuration information for reporting the CSI,
before the transmitting, by the first terminal device, the CSI of the first terminal device to the network device, the method further comprises:
determining, by the first terminal device, according to the physical resource configuration information for reporting the CSI, a first reporting resource for reporting the CSI of the first terminal device;
wherein the transmitting, by the first terminal device, the CSI of the first terminal device to the network device comprises:
transmitting, by the first terminal device, the CSI of the first terminal device to the network device over the first reporting resource.

8. The method according to claim 1, wherein before the transmitting, by the first terminal device, the CSI of the first terminal device to the network device according to the DCI, further comprising:
receiving, by the first terminal device, information about the number of times for reporting the CSI and/or information about a duration for reporting the CSI transmitted by the network device;
wherein the transmitting, by the first terminal device, the CSI of the first terminal device to the network device comprises:
determining, by the first terminal device, according to the information about the number of times for reporting the CSI and/or the information about the duration for reporting the CSI, the number of times for reporting the CSI and/or the duration for reporting the CSI; and
transmitting, by the first terminal device, the CSI of the first terminal device to the network device according to the number of times for reporting the CSI and/or the duration for reporting the CSI.

9. A method for transmitting channel state information (CSI), comprising:
transmitting, by a network device, downlink control information (DCI) to a first terminal device; and
receiving, by the network device, CSI of the first terminal device transmitted by the first terminal device according to the DCI;
wherein the DCI is used to indicate whether each of a plurality of terminal devices reports the CSI, and the plurality of terminal devices comprises the first terminal device,
wherein the DCI comprises resource configuration information for measuring the CSI,
wherein before the transmitting, by the network device, the downlink control information DCI to the first terminal device, the method further comprising:
transmitting, by the network device, N first measurement resource configuration to the first terminal device, so that the first terminal device determines, according to indication information about measurement resource configuration comprised in the resource configuration information for measuring the CSI, M first measurement resource configuration from the N first measurement resource configuration, and determines, according to the M first measurement resource configuration, the first measurement resource for measuring the CSI of the first terminal device, wherein M is an integer greater than or equal to 1 and less than or equal to N, and N is an integer greater than 1.

10. The method according to claim 9, wherein the DCI comprises at least one of the following: a bit sequence for triggering reporting of the CSI, information about the number of times for reporting the CSI, information about a duration for reporting the CSI, physical resource configuration information for reporting the CSI, indication information about a modulation and coding scheme (MCS) for transmitting the CSI, transmission mode hypothesis information, information about a type for reporting the CSI, codebook indication information, and codebook subset constraint information; wherein a bit in the bit sequence for triggering reporting of the CSI is used to indicate whether each of a plurality of terminal devices reports the CSI, the plurality of terminal devices comprises the first terminal device, the information about the number of times for reporting the CSI is used to indicate the number of times for a terminal device of the plurality of terminal devices that needs to measure the CSI to report the CSI, the information about the duration for reporting the CSI is used to indicate a duration for the terminal device of the plurality of terminal devices that needs to measure the CSI to report the CSI, the physical resource configuration information for reporting the CSI is used to indicate a physical resource used by the terminal device of the plurality of terminal devices that needs to measure the CSI to report the CSI, the resource configuration information for measuring the CSI is used to indicate a resource used by the terminal device of the plurality of terminal devices that needs to report the CSI to measure the CSI, the indication information about the MCS for transmitting the CSI is used to indicate a modulation and coding scheme used by the terminal device of the plurality of terminal devices that needs to measure the CSI to report the CSI, the transmission mode hypothesis information is used to indicate a transmission mode used by the network device to transmit downlink data to the terminal device of the plurality of terminal devices that needs to report the CSI, the information about the type for reporting the CSI is used to indicate a type for the terminal device of the plurality of terminal devices that needs to measure the CSI to report the CSI, the code book indication information is used to indicate a code book based on which the terminal device of the plurality of terminal devices that needs to report the CSI measures the CSI and reports the CSI, and the codebook subset constraint information is used to indicate a codeword based on which the terminal device of the plurality of terminal devices that needs to report the CSI measures the CSI and reports the CSI.

11. The method according to claim 10, wherein the DCI comprises at least one of the bit sequence for triggering reporting of the CSI and the physical resource configuration information for reporting the CSI,
when the DCI comprises the bit sequence for triggering reporting of the CSI,
before the receiving, by the network device, the CSI of the first terminal device transmitted by the first terminal device according to the DCI, the method further comprises:
transmitting, by the network device, index information of the first terminal device to the first terminal device, wherein the index information of the first terminal device is used to indicate a position of a bit for triggering reporting of the CSI corresponding to the first terminal device in the bit sequence for triggering reporting of the CSI, so that the first terminal device determines, according to the index information of the first terminal device, the bit for triggering reporting of the CSI corresponding to the first terminal device, and determines, according to the bit for triggering reporting of the CSI, whether it is necessary to report the CSI of the first terminal device; or when the DCI comprises the physical resource configuration information for reporting the CSI, wherein the receiving, by the network device, the CSI of the first terminal device transmitted by the first terminal device according to the DCI comprises:

receiving, by the network device, the CSI of the first terminal device transmitted by the first terminal device over a first reporting resource, wherein the first reporting resource is determined by the first terminal device according to the physical resource configuration information for reporting the CSI comprised in the DCI;

wherein before the receiving, by the network device, the CSI of the first terminal device transmitted by the first terminal device according to the DCI, further comprising:

transmitting, by the network device, a physical resource index to the first terminal device, wherein the physical resource index is used to indicate a position of a resource for transmitting the CSI of the first terminal device;

wherein the receiving, by the network device, the CSI of the first terminal device transmitted by the first terminal device over the first reporting resource comprises:

receiving, by the network device, the CSI of the first terminal device transmitted over the first reporting resource determined by the first terminal device from resources of a first resource region according to the physical resource configuration information for reporting the CSI, wherein the first resource region is determined according to the physical resource configuration information for reporting the CSI;

wherein before the receiving, by the network device, the CSI of the first terminal device transmitted by the first terminal device according to the DCI, further comprising:

transmitting, by the network device, an index of the first terminal device to the first terminal device, wherein the index of the first terminal device is used to indicate information about a position of the first terminal device in the terminal device that needs to report the CSI;

wherein the receiving, by the network device, the CSI of the first terminal device transmitted by the first terminal device over the first reporting resource comprises:

receiving, by the network device, the CSI of the first terminal device transmitted over the first reporting resource determined by the first terminal device from resources of the first resource region according to the index of the first terminal device, wherein the first resource region is determined according to the physical resource configuration information for reporting the CSI.

12. An apparatus for transmitting channel state information (CSI), comprising:
a memory, a processor, and a computer program stored on the memory and operable on the processor,
wherein the processor, when running the computer program, is configured to:
receive downlink control information (DCI) transmitted by a network device;

determine, according to the DCI, whether it is necessary to report CSI; and when the processor determines that it is necessary to report the CSI, transmit the CSI of the apparatus to the network device;

wherein the DCI is used to indicate whether each of a plurality of terminal devices reports the CSI, and the plurality of terminal devices comprises the apparatus, wherein the apparatus further comprises:

a measuring module, configured to, before the CSI of the apparatus is transmitted to the network device according to the DCI, measure the CSI of the apparatus, wherein the DCI comprises resource configuration information for measuring the CSI, the determining module is configured to determine, according to the resource configuration information for measuring the CSI, a first measurement resource for measuring the CSI of the apparatus; and the measuring module is configured to measure the CSI of the apparatus according to the first measurement resource;

wherein the determining module is configured to:

determine, according to a first measurement resource configuration comprised in the resource configuration information for measuring the CSI, the first measurement resource for measuring the CSI of the apparatus;

wherein the receiving module is configured to:

before the first measurement resource for measuring the CSI of the apparatus is determined according to the resource configuration information for measuring the CSI, receive N first measurement resource configuration transmitted by the network device;

the determining module is further configured to determine, according to indication information about measurement resource configuration comprised in the resource configuration information for measuring the CSI, M first measurement resource configuration from the N first measurement resource configuration; and determine, according to the M first measurement resource configuration, the first measurement resource for measuring the CSI of the apparatus, wherein M is an integer greater than or equal to 1 and less than or equal to N, and N is an integer greater than 1.

13. The apparatus according to claim 12, wherein the DCI further comprises at least one of the following: a bit sequence for triggering reporting of the CSI, information about the number of times for reporting the CSI, information about a duration for reporting the CSI, physical resource configuration information for reporting the CSI, indication information about a modulation and coding scheme (MCS) for transmitting the CSI, transmission mode hypothesis information, information about a type for reporting the CSI, codebook indication information, and codebook subset constraint information;

wherein a bit in the bit sequence for triggering reporting of the CSI is used to indicate whether each of a plurality of terminal devices reports the CSI, the plurality of terminal devices comprises a first terminal device, the information about the number of times for reporting the CSI is used to indicate the number of times for the first terminal device to report the CSI, the information about the duration for reporting the CSI is used to indicate a duration for the first terminal device to report the CSI, the physical resource configuration information for reporting the CSI is used to indicate a physical resource used by the first terminal device to report the CSI, the resource configuration information for measuring the CSI is used to indicate a resource used by the first terminal device to measure the CSI, the indication information about the MCS for transmitting the CSI is used to indicate a modulation and coding scheme used by the first terminal device to report the CSI, the transmission mode hypothesis information is used to indicate a transmission mode used by the network device to transmit downlink data to the first terminal device, the information about the type for reporting the CSI is used to indicate a type for the first terminal device to report the CSI, the codebook indication information is used to indicate a codebook based on which the first terminal device measures the CSI and reports the CSI, and the codebook subset constraint information is used to indicate a codeword based on which the first terminal device measures the CSI and reports the CSI.

* * * * *